US011947913B1

(12) United States Patent  
Ramos et al.

(10) Patent No.: US 11,947,913 B1  
(45) Date of Patent: Apr. 2, 2024

(54) MULTI-STAGE ENTITY RESOLUTION

(71) Applicant: Amazon Technologies, Inc., Seattle, WA (US)

(72) Inventors: David Paul Ramos, Aptos, CA (US); Tonytip Ketudat, Nahant, MA (US); Vikas Chawla, Lexington, MA (US); Lukas Leon Brower, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 352 days.

(21) Appl. No.: 17/356,885

(22) Filed: Jun. 24, 2021

(51) Int. Cl.
- *G06F 40/295* (2020.01)
- *G10L 13/08* (2013.01)
- *G10L 15/183* (2013.01)
- *G10L 15/22* (2006.01)

(52) U.S. Cl.
CPC ............ *G06F 40/295* (2020.01); *G10L 13/08* (2013.01); *G10L 15/183* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 8,606,568 | B1* | 12/2013 | Tickner | G10L 15/22 704/251 |
| 2009/0144609 | A1* | 6/2009 | Liang | G06F 40/284 707/999.005 |
| 2009/0234647 | A1* | 9/2009 | Scholz | G10L 15/30 704/235 |
| 2012/0284247 | A1* | 11/2012 | Jiang | G06F 16/9535 707/706 |
| 2016/0188684 | A1* | 6/2016 | Glover | G06F 16/951 707/722 |
| 2020/0184959 | A1* | 6/2020 | Yasa | G06F 40/30 |
| 2020/0380073 | A1* | 12/2020 | Hild | G10L 21/0364 |

* cited by examiner

*Primary Examiner* — Jesse S Pullias

(74) *Attorney, Agent, or Firm* — Pierce Atwood LLP

(57) ABSTRACT

Techniques for performing multi-stage entity resolution (ER) processing are described. A system may determine a portion of a user input corresponding to an entity name, and may request an entity provider component to perform a search to determine one or more entities corresponding to the entity name. The preliminary search results may be sent to a skill selection component for processing, while the entity provider component performs a complete search to determine entities corresponding to the entity name. A selected skill component may request the complete search results to perform its processing, including determining an output responsive to the user input.

22 Claims, 13 Drawing Sheets

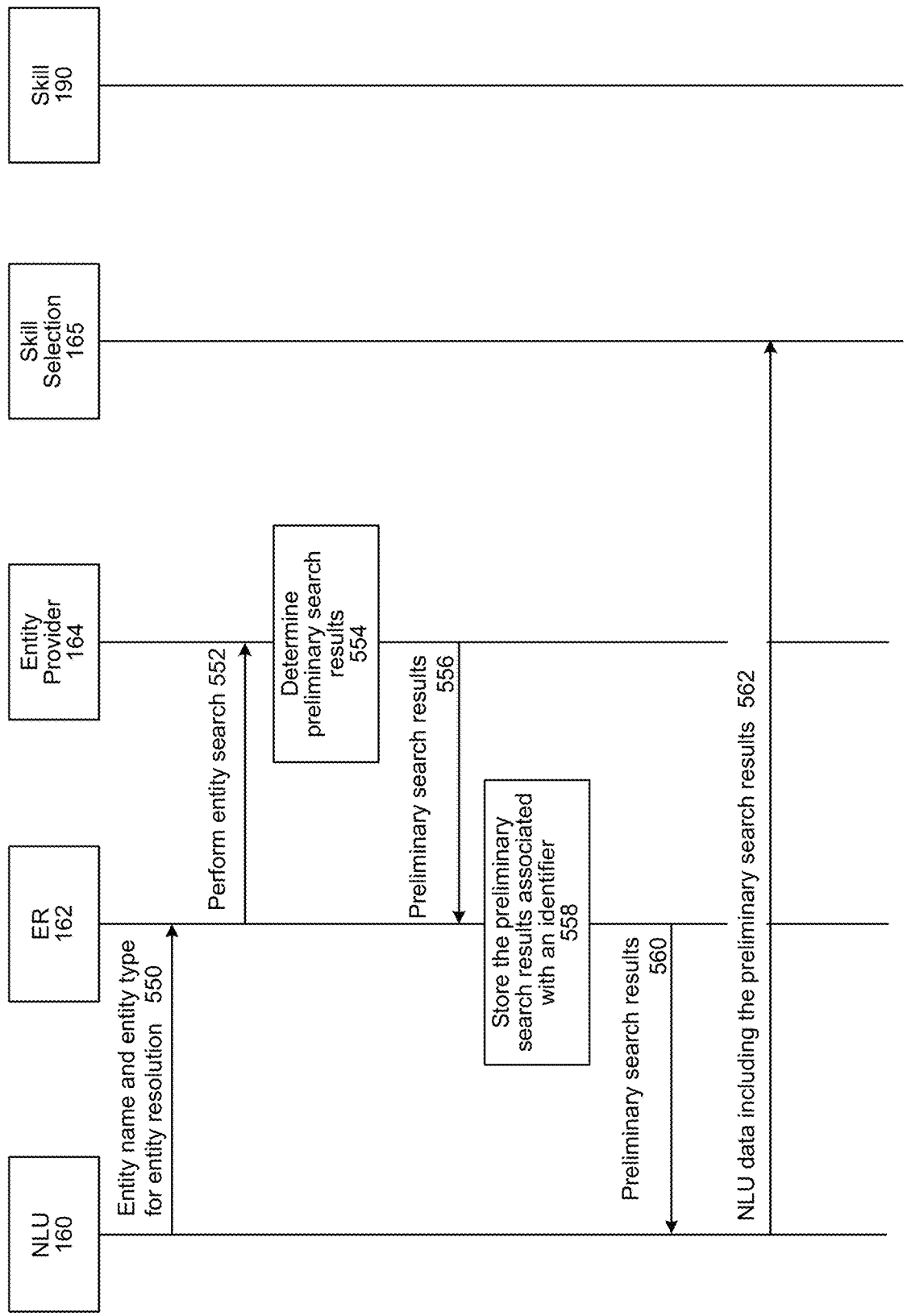

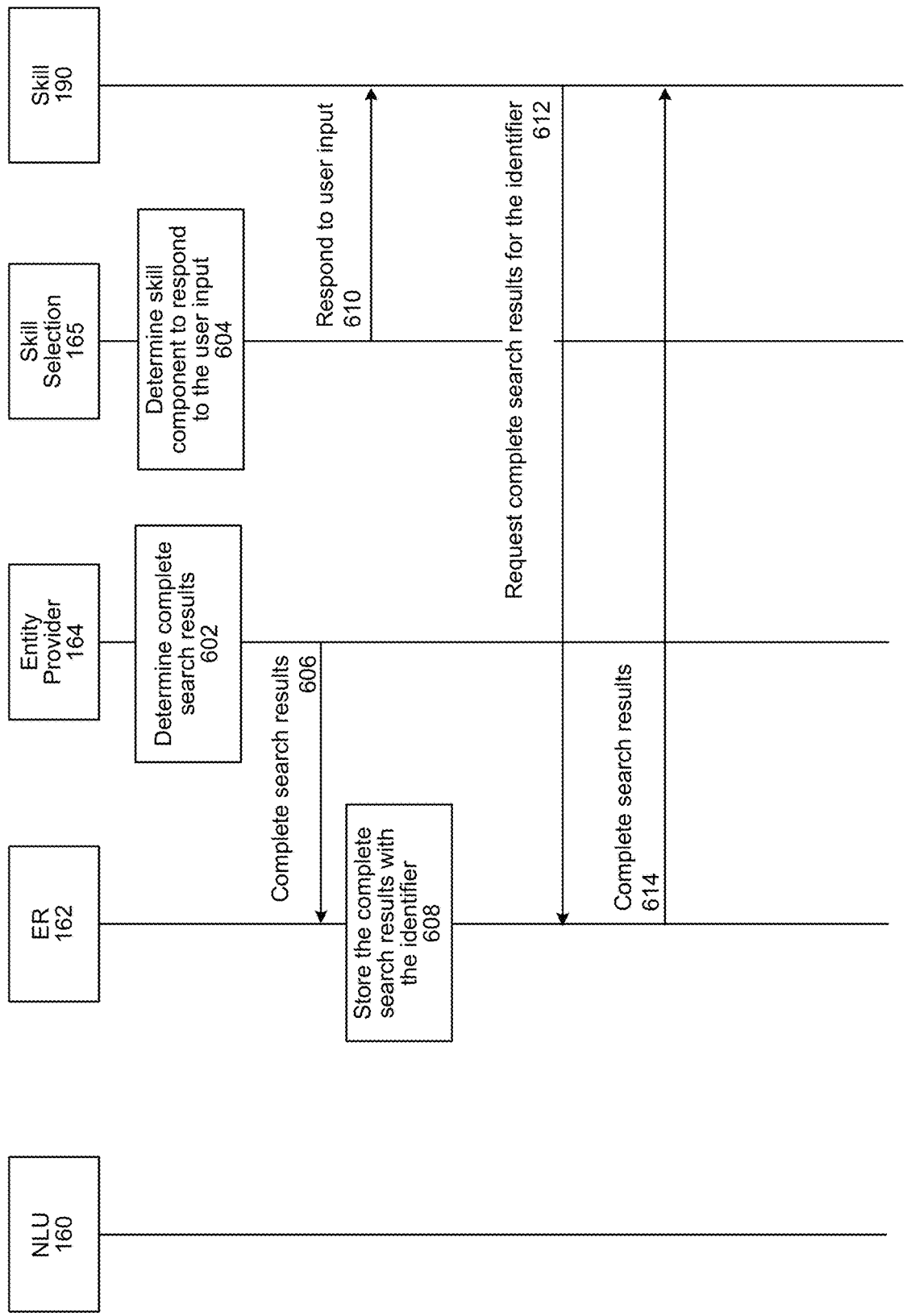

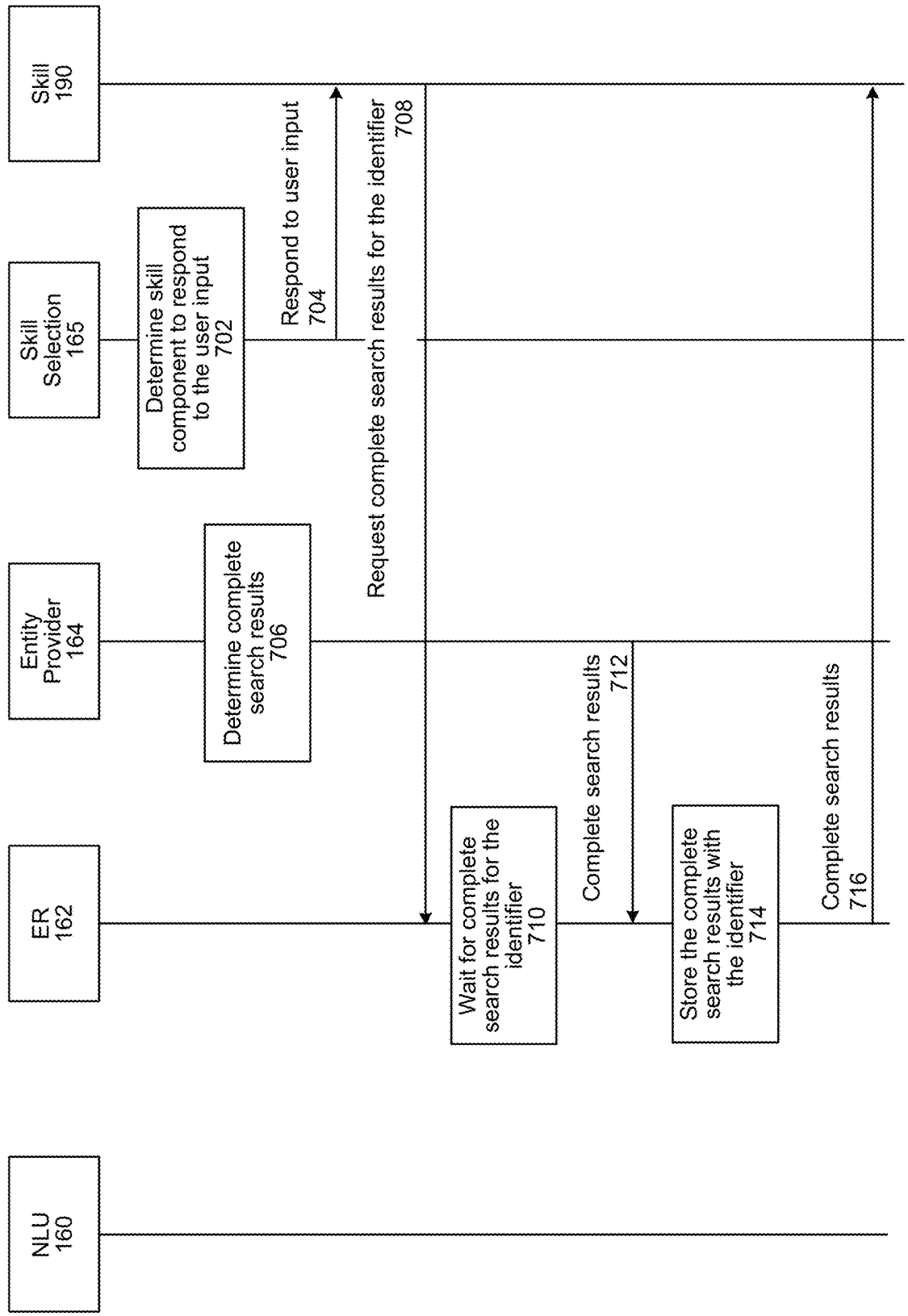

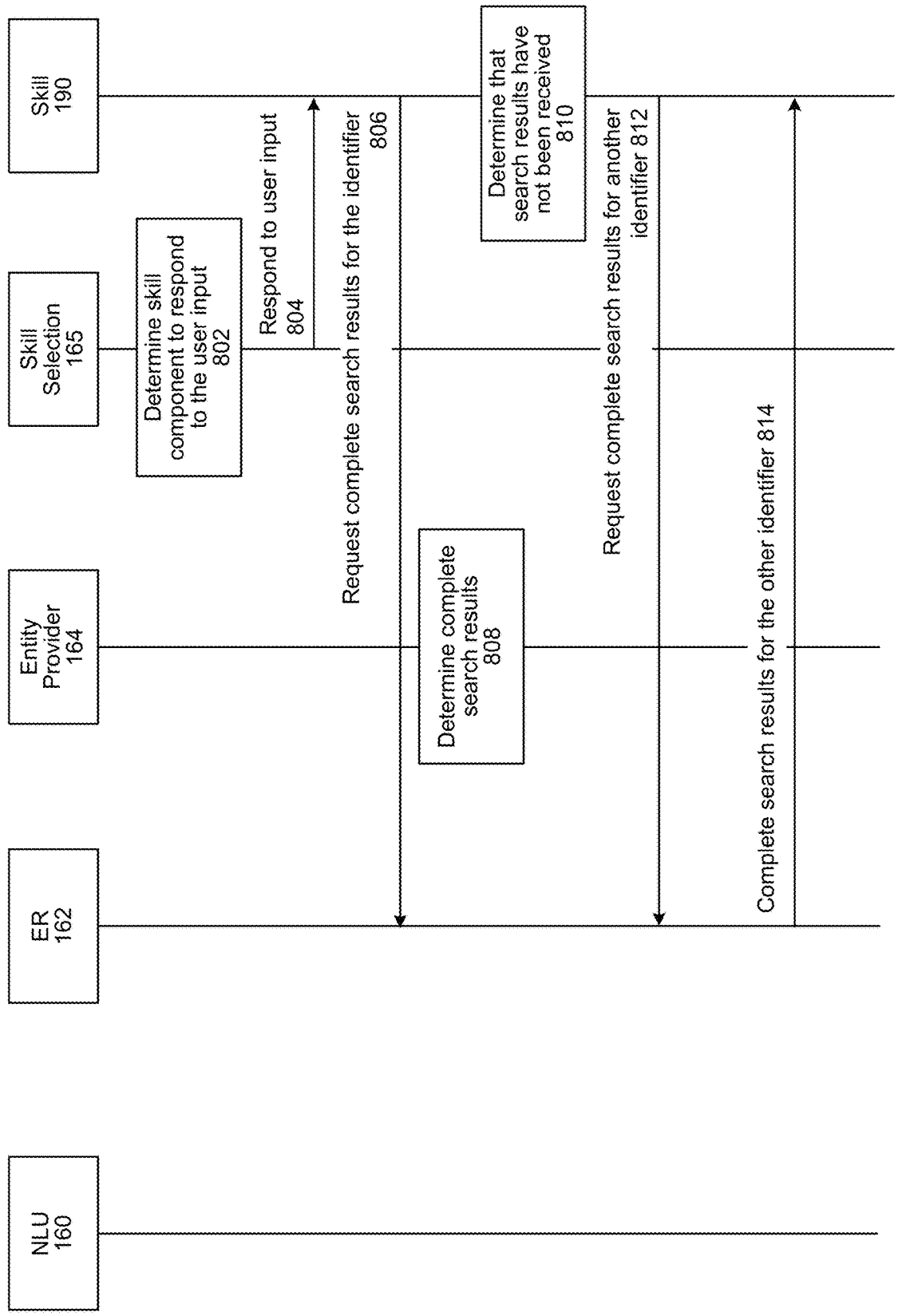

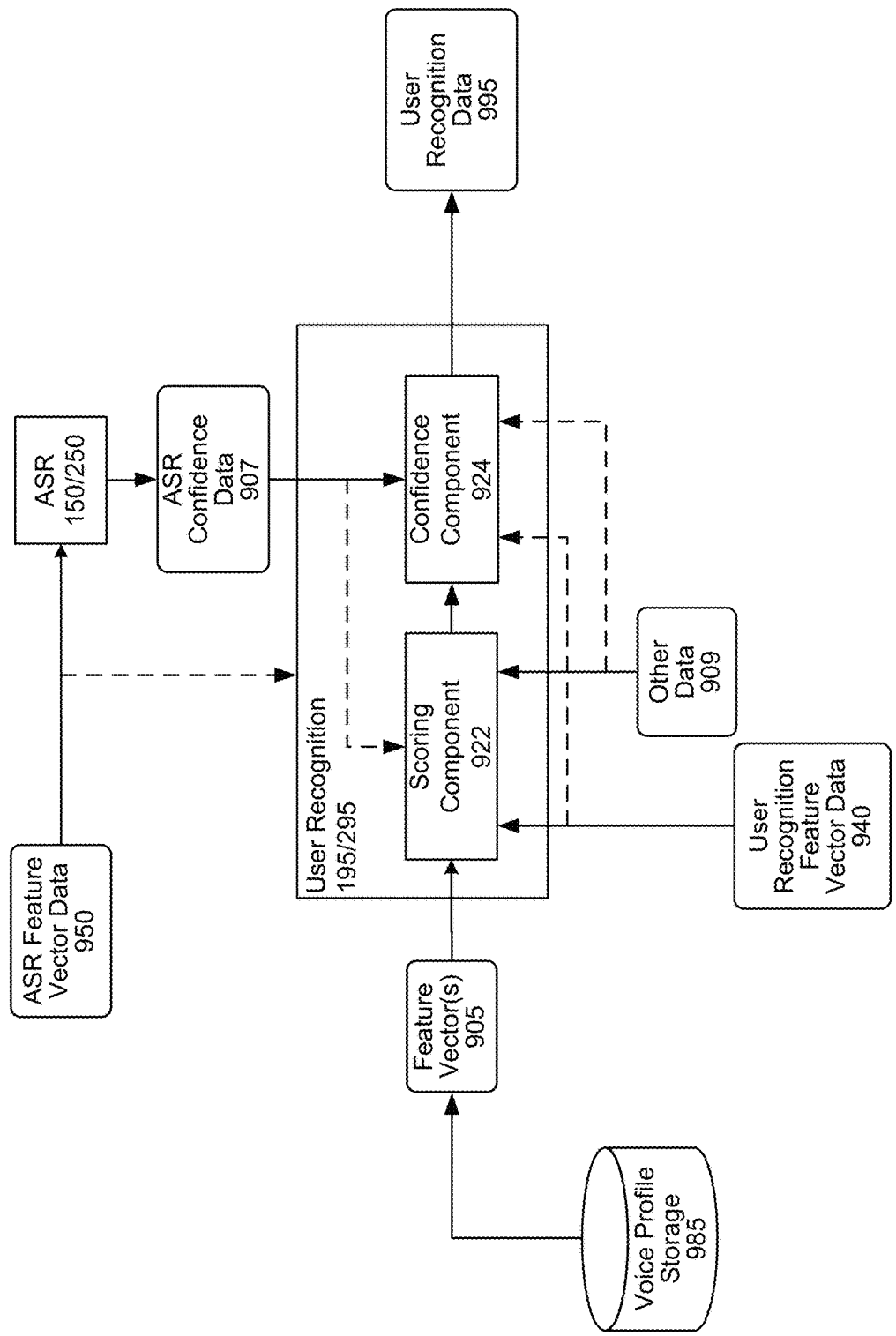

MULTI-STAGE ENTITY RESOLUTION

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 is a signal flow diagram illustrating how an entity resolution (ER) component may perform a preliminary search stage, according to embodiments of the present disclosure.

FIG. 6 is a signal flow diagram illustrating how a skill component may receive entity search results, according to embodiments of the present disclosure.

FIG. 7 is a signal flow diagram illustrating how the skill component may receive entity search results, according to embodiments of the present disclosure.

FIG. 8 is a signal flow diagram illustrating how the skill component may receive entity search results, according to embodiments of the present disclosure.

FIG. 9B is a system flow diagram illustrating user recognition, according to embodiments of the present disclosure.

DETAILED DESCRIPTION

Figure 1:
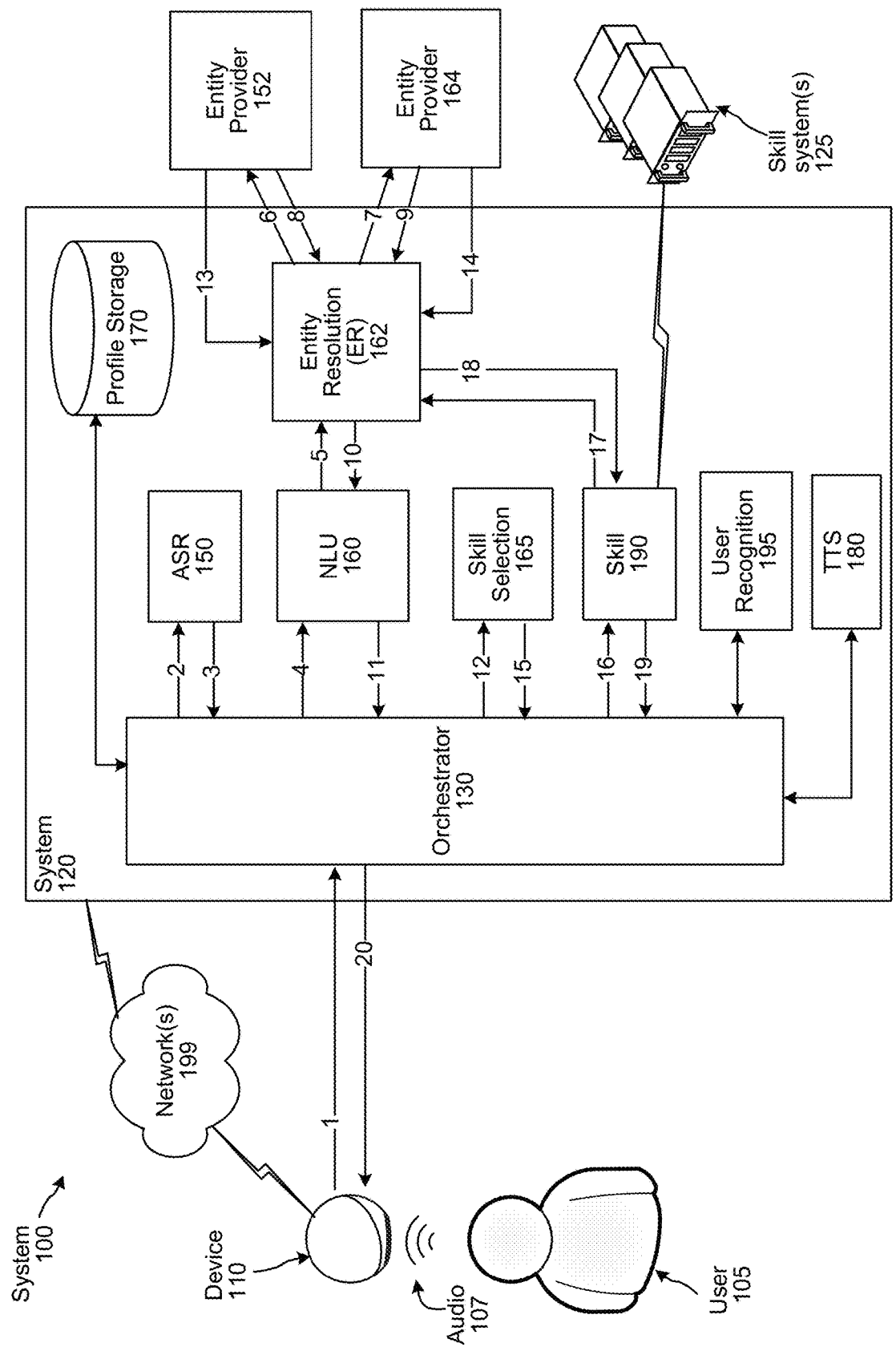
FIG. 1 is a conceptual diagram illustrating an example configuration of a system for performing multi-stage entity resolution, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

NLU processing involves named entity recognition (NER) processing and entity resolution (ER) processing. NER processing involves identifying portions of a user input that mention an entity, such as a person, a place, an organization, a date, a time, or other things, and a type of entity mentioned in the user input. For example, in a user input "Alexa play music by [artist]," NER processing determines that the fifth word in the user input (i.e., "[artist]") relates to an entity, and determines the entity type as "person" or "artist." After NER processing identifies a portion of the user input that relates to an entity and entity type, ER processing determines which specific entity that portion of the user input corresponds to. Continuing with the foregoing example, ER processing determines which specific artist the user is referring to. For example, there may be two or more artists that have similar names as the one mentioned in the user input, and ER processing determines which of these artists the user is referring to. ER processing may use context from the other words in the user input and an entity catalog to determine the specific entity.

Certain systems may perform NLU processing and NER processing to determine an intent and entity types corresponding to a user input. Then perform ER processing by searching one or more entity databases to determine specific entities corresponding to the portions of the user input identified during NER processing. The intent, entity types, and results of ER processing may then be provided to a skill selection component to determine which skill is to respond to the user input.

There are certain delays and payload costs in operating such a system. Searching the different entity databases may take some time, and the search results may be quite large in size. Waiting for the search results and transmitting them to other downstream components may cause delays in the system responding to the user input.

The present disclosure describes techniques for multi-stage ER processing that results in latency savings. A system, according to embodiments of the present disclosure, performs a preliminary search of an entity database to determine whether at least one entity, mentioned in a user input, exists in the entity database, and sends the preliminary search results to the skill selection component. While the skill selection component is performing its processing, the system performs a more extensive complete search of the entity database to determine one or more specific entities corresponding to the at least one entity mentioned in the user input. The results of the complete search are stored, and the selected skill component can request the results of the complete search to perform its processing. The preliminary search may be constrained with respect to an amount of time that can be spent searching and/or with respect to a data size of the search results. The complete search may not have any such constraints. In this manner, a smaller amount of data (the preliminary ER search results), as compared to the complete ER search results, are sent to downstream components, such as the skill selection component for processing. The complete ER search results, which is a larger amount of data compared to the preliminary ER search results, are stored and available to components, such as skill components, upon request.

The techniques of the present disclosure may reduce the delay in responding to a user input. For example, performing complete ER searches in parallel to user input processing by the system (e.g., processing by the skill selection component) may result in latency savings. As another example, reducing the amount of data being transmitted between components in the system may result in latency savings by reducing the time needed for encryption, serialization and transport. As a further example, the system may filter out some entity databases when performing the complete search based on the preliminary search results indicating that the entity database does not include an entity corresponding to the user input, which may result in latency savings.

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 shows a system 100 configured to process a user input and perform multi-stage ER processing, in accordance with example embodiments. As shown in FIG. 1, the system 100 may include a device 110, local to a user 105, and a system 120 connected across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech processing system configured to process spoken natural language inputs using ASR and NLU processing. The system 120 may include multiple components to facilitate speech processing, such as, an orchestrator component 130, an ASR component 150, a NLU component 160, an entity resolution (ER) component 162, a skill selection component 165, and one or more skill components 190. The system 120 may also include a profile storage 170, a TTS component 180, and a user recognition component 195 to facilitate processing of users inputs and generating outputs. The system 120 may also communicate with one or more skill systems 125.

In some embodiments, the system 120 may be in (wired or wireless) communication with one or more entity provider components 152, 164. In other embodiments, the system 120 may include one or more of the entity provider components 152, 164. Each of the entity provider components 152, 164 may include one or more entity databases storing data representing entities that the entity provider component 152, 164 has access to (e.g., is capable of processing, is capable of providing to the system 120 for processing, etc.). For example, the entity provider component 152 may be a first music provider having access to a first catalog of music entities, and the entity provider component 164 may be a second music provider having access to a second catalog of music entities. Other example entity provider components may be video entity providers, news entity providers, movie entity providers, knowledge bases, e-book entity providers, product/item providers, etc. In some embodiments, each of the entity provider components 152, 164 may be implemented as one or more entity systems, which may include one or more components described below in relation to FIG. 11.

Referring to FIG. 1, the user 105 may speak an input, and the device 110 may capture audio 107 representing the spoken input. For example, the user 105 may say "Alexa, play music by [first artist]" or "Alexa, play [title]." In other examples, the user 105 may provide another type of input (e.g., selection of a button, selection of one or more displayed graphical interface elements, performance of a gesture, etc.). The device 110 may send (step 1) audio data (or other type of input data, such as, image data, text data, etc.) corresponding to the user input to the system 120 for processing. The orchestrator component 130 may receive the input data from the device 110. In the case that the input data is audio data, the orchestrator component 130 may send (step 2) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 3) the ASR data to the orchestrator component 130.

The orchestrator component 130 may send (step 4) the ASR data to the NLU component 160, and the NLU component 160 may process the ASR data to determine an intent corresponding to the user input. The NLU component 160 may also determine a domain corresponding to the user input. The NLU component 160 may also perform NER processing to identify portions of the user input that relate to entities and corresponding entity types. The NLU component 160 may send (step 5), to the ER component 162, a request to perform entity resolution for the user input. The request may include the ASR data, indications of the portions identified by NER processing as relating to entities, and the entity types. The NLU component 160 may also send other data corresponding to the user input, such as the intent, the domain, etc. For example, for the user input "Alexa, play music by [first artist]", the NLU component 160 may send {intent: <PlayMusic>; entity: "first artist"; entity type: <ArtistName>}. The NLU component 160 may send multiple hypotheses, when applicable, indicating different entities and entity types. For example, for the user input "Alexa, play [title]", the NLU component 160 may send a first hypothesis {intent: <PlayMusic>; entity: "title"; entity type: <SongName>}, a second hypothesis {intent: <PlayMovie>); entity: "title", entity type<<MovieName>}, etc.

The ER component 162 may be configured to perform multi-stage ER processing. The ER component 162 may send (step 6), to the entity provider component 152, a first command to perform an entity search for each entity name-entity type pair provided by the NLU component 160. The ER component 162 may send (step 7), to the entity provider component 164, a second command to perform an entity search for at least one entity name-entity type pair provided by the NLU component. The first and second command may be sent at substantially the same time. The first command may include a first identifier (e.g., a first entity results identifier) which may be used later to access any complete search results from the entity provider component 152, and the second command may include a second identifier (e.g., a second entity results identifier) which may be used later to access any complete search results from the entity provider component 164.

In some embodiments, the first and second commands, of the steps 6 and 7, may be a preliminary search request. In such embodiments, the first and second commands may include a duration of time (a time constraint) within which the entity provider component 152, 164 has to return search results. Additionally or alternatively, the first and second commands may include an amount of data (size constraint) indicating the maximum amount of data (which affects the number of entity results) the entity provider component 152, 164 can provide as the search results. In such other embodiments, the first and second commands may be commands to perform preliminary searches without specifying any constraints, and the entity provider component 152, 164 may use time constraints and/or size constraints (stored at the entity provider component 152, 164) in generating the search results.

In some embodiments, the preliminary search may involve the entity provider component 152, 164 determining whether the entity name(s) (determined by the NLU component 160 and provided by the ER component 162) exists in its entity database. For example, in the case the entity provider component 152 is a music provider, during the preliminary search, the entity provider component 152 may determine whether the entity name "[first artist]" is available in its music catalog. As another example, during the preliminary search, the entity provider component 164, which may be a music provider, may determine that the entity name "[title]" is not available in its music catalog (perhaps because "[title]" is a movie and not a song). As further examples, the entity provider components 152, 164 may determine multiple entities that correspond to (e.g., match, substantially match, semantically match, etc.) the entity name determined by the NLU component 160.

The entity provider component 152 may send (step 8), to the ER component 162, first data representing search results in response to the first command. The first data may be associated with the first entity results identifier or the first data may include the first entity results identifier. The entity provider component 164 may send (step 9), to the ER component 162, second data representing search results in response to the second command. The second data may be associated with the second entity results identifier or the second data may include the second entity results identifiers. The first and second data may be preliminary search results, and may satisfy any size constraints indicated for the preliminary searches. In some embodiments, each of the first and second data may include an indication that these search results are preliminary results. The first data may include one or more first entities corresponding to the entity name, where each entity of the one or more first entities may be associated with an entity identifier (that uniquely identifies the entity within the entity provider component 152), an entity name (used to identify the entity within the entity provider component 152), and a confidence score (indicating a likelihood of the entity corresponds to the searched entity name). The second data may one or more second entities corresponding to the entity name, where each entity of the one or more second entities may be associated with an entity identifier (that uniquely identifies the entity within the entity provider component 164), an entity name (used to identify the entity within the entity provider component 164), and a confidence score (indicating a likelihood of the entity corresponds to the searched entity name).

Each of the first and second data may include an indication of the result of the preliminary search. For example, if the entity provider component 152 determines one or more entities in its databases as corresponding to the searched entity name(s), then the first data may include the indication "ER_Success." As another example, if the entity provider component 164 cannot find any entities in its databases corresponding to the searched entity name(s), then the second data may include the indication "ER_No_Match." Another example indication included in the preliminary search results (e.g., the first data or the second data) may be "ER_Exception" indicating that there was an error in performing the search by the entity provider component 152, 164. Another example indication included in the preliminary search results (e.g., the first data or the second data) may be "ER_Timeout" indicating that the time limit was reached before any entities were found.

The ER component 162 may send (step 10) the first data and the second data, representing the preliminary search results from the entity provider components 152, 164, to the NLU component 160. The NLU component 160 may determine NLU data including one or more NLU hypotheses corresponding to the user input, where each NLU hypothesis may include the domain, the intent, the entity name(s), the entity type(s), and the preliminary search results from the entity provider components 152, 164. Each NLU hypothesis may also include a confidence score indicating a likelihood of the NLU hypothesis corresponds to the user input. Details on how the NLU component 160 may process the ASR data and determine the NLU data are described below in relation to FIGS. 3 and 4.

The NLU component 160 may send (step 11) the NLU data to the orchestrator component 130. In some embodiments, while the NLU component 160 is determining the NLU data and sending the NLU data to the orchestrator 130, the ER component 162 may send commands to the entity provider components 152, 164 to perform a complete search for the entity name(s) and entity type(s) (provided by the NLU component in the step 5). For example, the ER component 162 may send a third command to the entity provider component 152 to perform entity complete search for the entity name(s) and entity type(s), and may send a fourth command to the entity provider component 164 to perform a complete entity search for the entity name(s) and entity type(s). The third and fourth commands may be sent at substantially the same time, and while the NLU component 160 is sending the NLU data to the orchestrator component 130. In some embodiments, the third and fourth commands may be sent prior to the NLU component 160 sending the NLU data to the orchestrator component 130. The third and fourth commands may each be a complete search request, and may not include any time constraints or size constraints that were included in the preliminary search request. The third command may include the first identifier (e.g., the first entity results identifier) to associate the complete search and complete search results with the preliminary search results from the entity provider component 152, and the fourth command may include the second identifier (e.g., the second entity results identifier) to associate the complete search and complete search results with the preliminary search results from the entity provider component 164.

In some embodiments, the entity providers 152, 164 may begin performing a complete entity search after determining and/or sending the preliminary search results, at the steps 8 and 9, to the ER component 162, and without receiving explicit commands from the ER component 162 to perform a complete entity search.

In some embodiments, a complete search may involve the entity provider component 152, 164 searching for entities that correspond to the entity name and entity type, and that further correspond to user profile data for the user 105, device data for the device 110, enabled skill components, personalized recommendations for the user 105, and/or other data. A skill component 190/skill system 125 may provide functionality that is free and/or functionality that requires a subscription to access. During the complete search, the entity provider components 152, 164 may determine entities that the user 105 is authorized to access based on, for example, what functionality the user 105 is subscribed for. For example, user profile data for the user 105 may include data representing which music catalogs and/or which particular songs/tracks the user 105 can access. Alternatively, the user profile data may indicate a subscription level (e.g., paid, free, unlimited, limited, etc.) for the user 105. During the complete search, the entity provider component 152, 164 may only return entities based on the user profile data. As another example, the device 110 may be capable of outputting certain types of data, such as, the device 110 can only output audio data, or the device 110 can output audio data and video data. During the complete search, the entity provider component 152, 164 may return entities that correspond to the output data that the device 110 is capable of outputting. As a further example, a particular set of skill components 190 may be enabled for the device 110 and/or the user 105 (as indicated by the user profile data), and during the complete search the entity provider components 152, 164 may return entities that can be processed by the enabled skill components 190. As yet another example, the user profile data may indicate one or more preferences of the user 105 (e.g., the user 105 likes to listen to a first version of a song by a first artist), and during the complete search the entity provider components 152, 164 may return personalized search results that include entities based on the one or more user preferences. As yet another example, the user profile data may include data representing historic interactions between the user 105 and the system 120, and during the complete search the entity provider components 152, 164 may return personalized search results based on the historic interactions. As such, during the complete search, the entity provider components 152, 164 may take into consideration additional data when searching for the entity name and entity type.

The entity provider component 152 may send (step 13), to the ER component 162, third data representing complete search results. The third data may be associated with the first entity results identifier. The entity provider component 164 may send (step 14), to the ER component 162, fourth data representing complete search results. The fourth data may be associated with the second entity results identifier. In some embodiments, each of the third and fourth data may include an indication that the search results are complete results, or the ER component 162 may add such an indication to the third and fourth data before storing. The third data may include one or more third entities corresponding to the entity name, where each entity of the one or more third entities may be associated with an entity identifier (that uniquely identifies the entity within the entity provider component 152), an entity name (used to identify the entity within the entity provider component 152), and a confidence score (indicating a likelihood of the entity corresponding to the searched entity name). The one or more third entities may be different than the one or more first entities (e.g., the third entities may include an entity that was not included in the first entities of the preliminary search results, the confidence scores may be different for the same entity in the third entities and the first entities, etc.). The fourth data may include one or more fourth entities corresponding to the entity name, where each entity of the fourth entities may be associated with an entity identifier (that uniquely identifies the entity within the entity provider component 164), an entity name (used to identify the entity within the entity provider component 164), and a confidence score (indicating a likelihood of the entity corresponding to the searched entity name). The one or more fourth entities may be different than the one or more second entities (e.g., the fourth entities may include an entity that was not included in the second entities of the preliminary search results, the confidence scores may be different for the same entity in the fourth entities and the second entities, etc.). The third and fourth data may each include an indication of the result of the complete search. Such indication may be, for example, the ones described above: "ER_Success", "ER_No_Match", "ER_Exception" or "ER_Timeout." The ER component 162 may store the third data including the first entity results identifier, and may store the fourth data including the second entity results identifier.

In some embodiments, the entity provider components 152, 164 may push entity search results to the ER component 162 as they are available. For example, the entity provider component 152, 164 may push first search results based on completing a search of a portion of its database, then continue searching of another portion of its database, and then push second search results based on completing the search of the other portion of its database.

While the entity provider components 152, 164 are performing the complete searches, the orchestrator component 130 may send (step 12) the NLU data to the skill selection component 165, so that the skill selection component 165 may perform it's processing in parallel to the complete entity searches. The skill selection component 165 may be configured to determine which skill component should respond to the user input based on which skill component is capable of processing the intent data and entity data included in the NLU data. For example, for the user input "Alexa, play music," the skill selection component 165 may determine a music skill is to respond to the user input. In some embodiments, the skill selection component 165 uses the preliminary search results as the entity data to select a skill component. Details on how the skill selection component 165 may process the NLU data and determine a skill component to execute are described below in relation to FIG. 4. The skill selection component 165 may send (step 15), to the orchestrator component 130, a skill identifier identifying the skill component 190 as the skill component that is to be used to respond to the user input.

Based on receiving the skill identifier from the skill selection component 165, the orchestrator component 130 may invoke (step 16) the skill component 190 associated with the skill identifier. In invoking the skill component 190, the orchestrator component 130 may send a command to the skill component 190 to perform an action corresponding to the NLU data determined by the NLU component 160. The orchestrator component 130 may also send, to the skill component 190, other data corresponding to the user input, such as the ASR data, information corresponding to the device 110 (e.g., device type, device location, device capabilities, etc.), the time when the user input was received by the system 120, user profile data (from the profile storage 170) associated with the user 105, and/or other data. In some embodiments, the orchestrator component 130 may send the data corresponding to the user input in response to the skill component 190 requesting such data.

The NLU data provided to the skill component 190 may include the preliminary entity search results, and the skill component 190 may need the complete entity search results to determine an output responsive to the user input. Using the preliminary entity search results, the skill component 190 may determine which entity provider component to request complete entity search results from. Such determination may be based on which entities the skill component 190 is capable processing, may be based on which entity databases (e.g., music catalog) is enabled for the user 105 and/or the device 110, may be based on a skill preference for an entity provider component, etc. In some cases, the skill component 190 may request complete entity search results from all of the entity provider components that performed preliminary searches for the user input. In this example, the skill component 190 may determine to request complete search results from the entity provider component 152, and may use the first entity search results identifier associated with the preliminary search results to request the complete results. The skill component 190 may send (step 17), to the ER component 162, a request for the complete entity search results associated with the first entity search results identifier. In response to the request, the ER component 162 may send (step 18) the third data, representing the complete search results from the entity provider component 152, to the skill component 190.

The skill component 190 may process the NLU data and the third data from the ER component 162, and may determine output data responsive to the user input. For example, for the user input "Alexa, play music by [first artist]," the output data determined by the skill component 190 (which may be a music skill) may be audio data corresponding to a song by the first artist. The skill component 190 may determine the audio data from the entity database of the entity provider component 152, using an entity identifier, included in the third data, associated with the entity name "[first artist]."

The skill component 190 may send (step 19) the output data to the orchestrator component 130 for output in response to the user input, and the orchestrator component 130 may send (step 20) the output data to the device 110 for output. In some embodiments, the orchestrator component 130 or the skill component 190 may send an indication to the ER component 162 that an output responsive to the user input has been presented, and that processing with respect to the user input has completed. Based on receiving this indication, the ER component 162 may discard the preliminary search results and the complete search results (i.e. the first, second, third and fourth data) corresponding to the user input. In some embodiments, the ER component 162 may discard the preliminary search results and the complete search results corresponding to the user input after a duration of time (e.g., 30 seconds, 1 minute, 1 hour, etc.) has elapsed since the skill component 190 requested the complete search results or since the complete search results were generated and stored. As such, the ER component 162 may act as a short-term storage for entity search results for a user input to make the entity search results available while the user input is being processed. The ER component 162 may include a database to store the preliminary search results and the complete search results.

In this manner, the system 120 may perform ER processing in stages, in parallel to other processing with respect to the user input. Described below are some other embodiments of the multi-stage ER processing techniques described herein.

The entity search results (the preliminary results and the complete results) may be associated with an identifier at the ER component 162 so that the skill component 190 is able to request the appropriate search results for processing. Each entity search for each entity provider component may be associated with a different identifier. As such, there may be multiple identifiers associated with the same user input. For example, multiple entity provider components may process to search for an entity name in the user input, where first (preliminary and complete) search results from a first entity provider component may be associated with a first identifier, second (preliminary and complete) search results from a second entity provider component may be associated with a second identifier, etc. In this example, when the skill component 190 wants the search results from the first entity provider, the skill component 190 may use the first identifier to request such search results from the ER component 162. As another example, the user input may include multiple entities, and first (preliminary and complete) search results for a first entity from a first entity provider component may be associated with a first identifier, second (preliminary and complete) search results for a second entity from the first entity provider component may be associated with a second identifier. In this example, when the skill component 190 wants the search results for the first entity, the skill component 190 may use the first identifier to request such search results from the ER component 162.

In some embodiments, the ER component 162 may send a search request (for entities corresponding to the entity name and entity type determined by the NLU component 160) to each of the entity provider component 152, 164. Such search requests may not be associated with any constraints (e.g., time constraints, size constraints, etc.). The entity provider component 152, 164 may perform an extensive complete search to determine one or more entities corresponding to the entity name and entity type, and may send data, to the ER component 162, representing the search results. The ER component 162 may truncate the search results from the entity provider component 152, 164, and may send the truncated search results to the NLU component 160. The truncated search results may be indicated as preliminary search results or may indicate to the NLU component 160 that an entity corresponding to the entity name exists at the particular entity provider component. As such, instead of the entity provider component 152, 164 performing a preliminary search and then performing a complete search, the ER component 162 truncates the search results to reduce the amount of data transmitted to downstream components (e.g., the NLU component 160).

In some embodiments, the ER component 162 may request a first entity provider component to perform a preliminary search and then a complete search based on the searching and processing capabilities of the first entity provider component. If a second entity provider component is not capable of performing a preliminary search, separate from a complete search, then the ER component 162 may request the second entity provider component to perform a complete search, and the ER component 162 may truncate the search results before sending to the NLU component 160.

In some embodiments, the ER component 162 may store the preliminary search results and the complete search results after the user input has been processed, in particular, when the user input is part of an on-going dialog session. The entity search results for the user input received in the step 1 may be used by the system 120 in processing any user input subsequently received during the dialog session. For example, the system 120 may determine that a subsequent user input from the user 105 is referring to an entity name provided in a previous user input (e.g., first user input may be "Alexa, play a song by [first artist]", and second user input may be "Alexa, play another song by him"), and the system 120 may use the entity search results for the previous user input to determine the entity being referred to in the subsequent user input. In such embodiments, the ER component 162 may discard the entity search results for the dialog session after the dialog is completed.

In some embodiments, the preliminary search results may be associated with a Uniform Resource Locator (URL), and the skill component 190 may use the URL to retrieve the complete search results corresponding to the preliminary search results.

In some embodiments, the ER component 162 may determine a merged list of entities using the preliminary search results from multiple entity provider components, such as, entity provider components 152 and 164. For example, the merged list may include entities from the first data/the one or more first entities and the second data/the one or more second entities. Each entity in the merged list may be associated with the identifier for the appropriate entity provider component. For example, a first entity in the merged list may be associated with the first entity search results identifier indicating that the first entity was found by the entity provider component 152, while a second entity in the merged list may be associated with the second entity search results identifier indicating that the second entity was found by the entity provider component 164. In some embodiments, the merged list of entities may be ranked by the ER component 162 based on the confidence scores associated with each entity. In some embodiments, the merged list of entities may include a N-best list of entities (i.e. entities associated with a confidence score satisfying a threshold value). The merged list of entities may be sent to the NLU component 160 (e.g., in the step 10) for including in the NLU data.

In a similar manner, the ER component 162 may determine a merged list of entities using the complete search results from multiple entity provider components, such as the entity provider components 152 and 164. This merged of list of entities may be ranked by the ER component 162, or may be a N-best list of entities, based on the confidence scores included in the third data and the fourth data. In some embodiments, the ER component 162 may provide the merged list of entities or the ranked/N-best list of entities to the skill component 190. In some embodiments, the skill component 190 may request complete search results from both of the entity provider components 152 and 164, and the ER component 162 may determine the merged list of entities or ranked/N-best list of entities in response to such a request.

In some embodiments, the data transmitted by the orchestrator component 130 to the various components of the system 120 may be encrypted and processed using other techniques to prepare the data for transport. Reducing the size of the NLU data, by including the preliminary entity search results, instead of the complete entity search results, reduces the amount of data the orchestrator component 130/the system 120 has to encrypt and decrypt, and in turn reduces the time it takes to respond to the user input. Latency is also reduced in responding to the user input by the skill component 190 directly requesting the complete entity search results from the ER component 160 rather than it being passed down through other components of the system 120 (e.g., the skill selection component 165).

The system 120 may use other components illustrated in FIG. 1. The various components shown in FIG. 1 may be located on a same or different physical devices. Communication between various components may occur directly or across the network(s) 199.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 220 (shown in FIG. 2). The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMIs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 220 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio, to the system 120. The audio data 211 may include the detected wakeword, or the device 110 may remove the portion of the audio data, corresponding to the detected wakeword, prior to sending the audio data 211 to the system 120.

Referring to FIG. 1, the orchestrator component 130 may be configured to, among other things, coordinate data transmissions between components of the system 120. The orchestrator component 130 may receive audio data from the device 110, and send the audio data to the ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data 211 with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to the NLU component 160.

The NLU component 160 processes the ASR output data or text data to determine one or more NLU hypotheses embodied in NLU output data. The NLU component 160 may perform intent classification (IC) processing on the ASR output data or text data to determine an intent of the natural language input. An intent corresponds to an action to be performed that is responsive to the natural language input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in ASR output data or text data to the words and phrases in an intents database. In some embodiments, the NLU component 160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 160 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 160 may be linked to one or more grammar frameworks with entity types to be populated with entity values. Each entity type of a grammar framework corresponds to a portion of ASR output data or text data that the NLU component 160 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data or text data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 160 may generate NLU output data including one or more NLU hypotheses, with each NLU hypothesis including an intent and optionally one or more entity types and corresponding entity values. In some embodiments, the NLU component 160 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component 160). In at least some embodiments, the system 120 may implement a spoken language understanding (SLU) component configured to process audio data 211 to determine NLU output data.

The SLU component may be equivalent to a combination of the ASR component 150 and the NLU component 160. Yet, the SLU component may process audio data 211 and directly determine the NLU output data, without an intermediate step of generating ASR output data. As such, the SLU component may take audio data 211 representing a spoken natural language input and attempt to make a semantic interpretation of the spoken natural language input. That is, the SLU component may determine a meaning associated with the spoken natural language input and then implement that meaning. For example, the SLU component may interpret audio data 211 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skills 125. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill 125, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 211. The user recognition component 195 may perform user recognition by comparing speech characteristics, in the audio data 211, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 2:
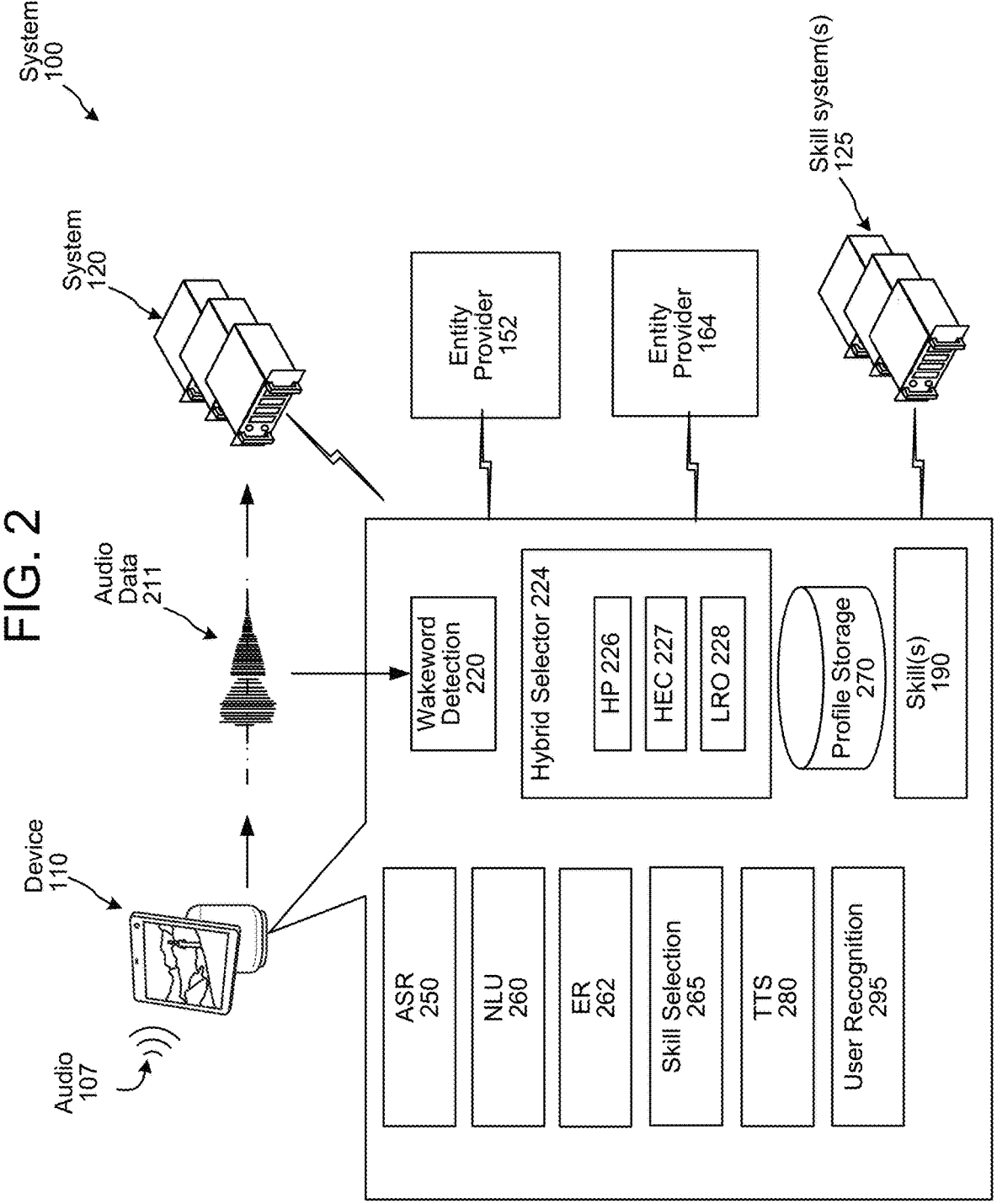
FIG. 2 is a conceptual diagram illustrating components that may be included in a device, according to embodiments of the present disclosure.

The foregoing describes illustrative components and processing of the system 120. The following describes illustrative components and processing of the device 110. As illustrated in FIG. 2, in at least some embodiments the system 120 may receive audio data 211 from the device 110, to recognize speech corresponding to a spoken natural language in the received audio data 211, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 220 configured to detect a wakeword (e.g., "Alexa") that indicates to the device 110 that the audio data 211 is to be processed for determining NLU output data. In at least some embodiments, a hybrid selector 224, of the device 110, may send the audio data 211 to the wakeword detection component 220. If the wakeword detection component 220 detects a wakeword in the audio data 211, the wakeword detection component 220 may send an indication of such detection to the hybrid selector 224. In response to receiving the indication, the hybrid selector 224 may send the audio data 211 to the system 120 and/or an ASR component 250. The wakeword detection component 220 may also send an indication, to the hybrid selector 224, representing a wakeword was not detected. In response to receiving such an indication, the hybrid selector 224 may refrain from sending the audio data 211 to the system 120, and may prevent the ASR component 250 from processing the audio data 211. In this situation, the audio data 211 can be discarded.

The device 110 may conduct its own speech processing using on-device language processing components (such as an on-device SLU component, an on-device ASR component 250, and/or an on-device NLU component 260) similar to the manner discussed above with respect to the speech processing system-implemented ASR component 150, and NLU component 160. The device 110 may also internally include, or otherwise have access to, other components such as one or more skills 190, a user recognition component 295 (configured to process in a similar manner to the speech processing system-implemented user recognition component 195), profile storage 270 (configured to store similar profile data to the speech processing system-implemented profile storage 170), and other components. In at least some embodiments, the on-device profile storage 270 may only store profile data for a user or group of users specifically associated with the device 110. The device 110 may also include an ER component 262 and a skill selection component 265 (configured to process in a similar manner to the ER component 162 and the skill selection component 165). In some embodiments, the device 110 may be in (wireless or wired) communication with the entity provider components 152 and 164. In other embodiments, the entity provider components 152 and 164 may be included in the device 110. In some embodiments, the ER component 262 may be configured to perform entity resolution using entity provider components enabled for the device 110/user 105. In some embodiments, the skill selection component 265 may be configured to select a skill component 190 from only skill components that are enabled for the device 110/user 105. The device 110 may also include a TTS component 280 that may be configured in a similar manner as the TTS component 180 described herein.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 224, of the device 110, may include a hybrid proxy (HP) 226 configured to proxy traffic to/from the system 120. For example, the HP 226 may be configured to send messages to/from a hybrid execution controller (HEC) 227 of the hybrid selector 224. For example, command/directive data received from the system 120 can be sent to the HEC 227 using the HP 226. The HP 226 may also be configured to allow the audio data 211 to pass to the system 120 while also receiving (e.g., intercepting) this audio data 211 and sending the audio data 211 to the HEC 227.

In at least some embodiments, the hybrid selector 224 may further include a local request orchestrator (LRO) 228 configured to notify the ASR component 250 about the availability of the audio data 211, and to otherwise initiate the operations of on-device language processing when the audio data 211 becomes available. In general, the hybrid selector 224 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 226 may allow the audio data 211 to pass through to the system 120 and the HP 226 may also input the audio data 211 to the ASR component 250 by routing the audio data 211 through the HEC 227 of the hybrid selector 224, whereby the LRO 228 notifies the ASR component 250 of the audio data 211. At this point, the hybrid selector 224 may wait for response data from either or both the system 120 and/or the on-device language processing components. However, the disclosure is not limited thereto, and in some examples the hybrid selector 224 may send the audio data 211 only to the ASR component 250 without departing from the disclosure. For example, the device 110 may process the audio data 211 on-device without sending the audio data 211 to the system 120.

The ASR component 250 is configured to receive the audio data 211 from the hybrid selector 224, and to recognize speech in the audio data 211, and the on-device NLU component 260 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 260) may be selected as usable to respond to a natural language input, and local response data may be sent (e.g., local NLU output data, local knowledge base information, internet search results, and/or local directive data) to the hybrid selector 224, such as a "ReadyToExecute" response. The hybrid selector 224 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 211 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 3:
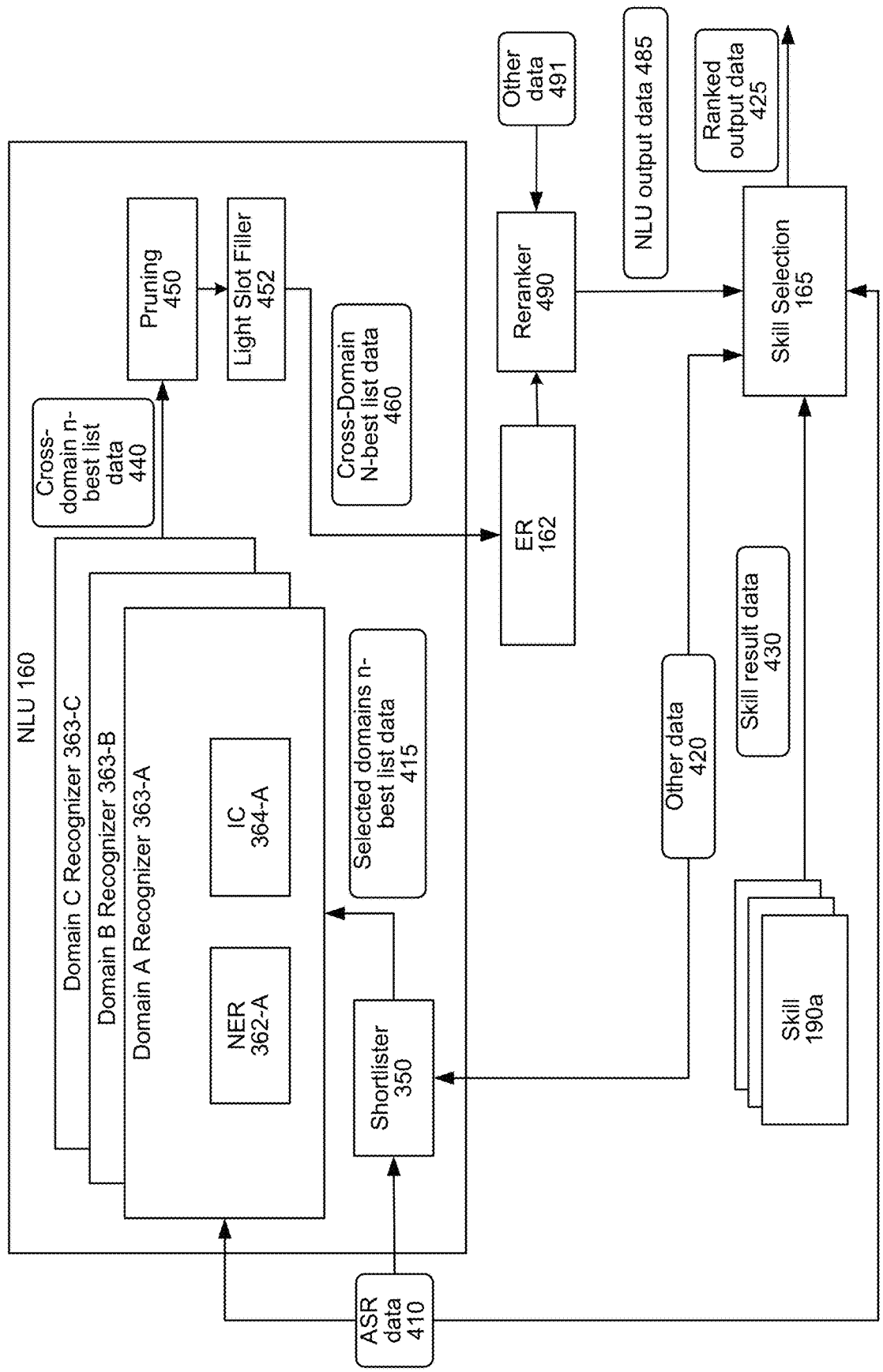
FIG. 3 is a conceptual diagram illustrating how NLU processing may be performed, according to embodiments of the present disclosure.

FIG. 3 illustrates how NLU processing is performed on ASR data (e.g., token data, text data, etc.). The NLU component 160 may process ASR data including several ASR hypotheses of a single user input. For example, if the ASR component 150 outputs ASR data including an N-best list of ASR hypotheses, the NLU component 160 may process the ASR data with respect to all (or a portion of) the ASR hypotheses represented therein.

The NLU component 160 may annotate ASR data by parsing and/or tagging the ASR data. For example, for the ASR data "tell me the weather for Seattle," the NLU component 160 may tag "tell me the weather for Seattle" as an <OutputWeather> intent as well as separately tag "Seattle" as a location for the weather information.

The NLU component 160 may include a shortlister component 350. The shortlister component 350 selects skills that may execute with respect to ASR data 410 input to the NLU component 160 (e.g., applications that may execute with respect to the user input). The shortlister component 350 thus limits downstream, more resource intensive NLU processes to being performed with respect to skills that may execute with respect to the user input.

Without a shortlister component 350, the NLU component 160 may process ASR data 410 input thereto with respect to every skill of the system, either in parallel, in series, or using some combination thereof. By implementing a shortlister component 350, the NLU component 160 may process ASR data 410 with respect to only the skills that may execute with respect to the user input. This reduces total compute power and latency attributed to NLU processing.

The shortlister component 350 may include one or more trained models. The model(s) may be trained to recognize various forms of user inputs that may be received by the system(s) 120. For example, during a training period skill system(s) 125 associated with a skill may provide the system(s) 120 with training ASR data representing sample user inputs that may be provided by a user to invoke the skill. For example, for a ride sharing skill, a skill system(s) 125 associated with the ride sharing skill may provide the system(s) 120 with training ASR data including text corresponding to "get me a cab to [location]," "get me a ride to [location]," "book me a cab to [location]," "book me a ride to [location]," etc. The one or more trained models that will be used by the shortlister component 350 may be trained, using the training ASR data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training ASR data indicating grammar and annotations. The system(s) 120 may use the training ASR data representing the sample user inputs, the determined related user input(s), the grammar, and the annotations to train a model(s) that indicates when a user input is likely to be directed to/handled by a skill, based at least in part on the structure of the user input. Each trained model of the shortlister component 350 may be trained with respect to a different skill. Alternatively, the shortlister component 350 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 350. For example, some sample user inputs may be positive examples (e.g., user inputs that may be used to invoke the skill). Other sample user inputs may be negative examples (e.g., user inputs that may not be used to invoke the skill).

As described above, the shortlister component 350 may include a different trained model for each skill of the system, a different trained model for each domain, or some other combination of trained model(s). For example, the shortlister component 350 may alternatively include a single model.

The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 350 to output indications of only a portion of the skills that the ASR data 410 may relate to. For example, a user input may correspond to "tell me about Tom Collins." If the model is clustered based on domain, the shortlister component 350 may determine the user input corresponds to a recipe skill (e.g., a drink recipe) even though the user input may also correspond to an information skill (e.g., including information about a person named Tom Collins).

Training the shortlister component 350 may require establishing a "ground truth" for the training examples input therein. The shortlister component 350 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 160 may include one or more recognizers 363. Each recognizer 363 may be associated with a different domain (e.g., smart home, video, music, weather, custom, etc.).

If the shortlister component 350 determines ASR data 410 is potentially associated with multiple domains, the recognizers 363 associated with the domains may process the ASR data 410, while recognizers 363 not indicated in the shortlister component 350's output may not process the ASR data 410. The "shortlisted" recognizers 363 may process the ASR data 410 in parallel, in series, partially in parallel, etc. For example, if ASR data 410 potentially relates to both a communications domain and a music domain, a recognizer associated with the communications domain may process the ASR data 410 in parallel, or partially in parallel, with a recognizer associated with the music domain processing the ASR data 410.

Each recognizer 363 may include a named entity recognition (NER) component 362. The NER component 362 attempts to identify grammars and lexical information that may be used to construe meaning with respect to ASR data input therein. The NER component 362 identifies portions of ASR data that correspond to a named entity associated with a domain, associated with the recognizer 363 implementing the NER component 362. The NER component 362 (or other component of the NLU component 160) may also determine whether a word refers to an entity whose identity is not explicitly mentioned in the ASR data, for example "him," "her," "it" or other anaphora, exophora, or the like.

Each recognizer 363, and more specifically each NER component 362, may be associated with a particular grammar database, a particular set of intents/actions, and a particular personalized lexicon. A gazetteer may include domain-indexed lexical information associated with a particular user and/or device 110. For example, a Gazetteer A includes domain-indexed lexical information. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 362 applies grammar information and lexical information associated with a domain (associated with the recognizer 363 implementing the NER component 362) to determine a mention of one or more entities in ASR data. In this manner, the NER component 362 identifies "slots" (each corresponding to one or more particular words in ASR data) that may be useful for later processing. The NER component 362 may also label each slot with a type (e.g., noun, place, city, artist name, song name, etc.).

Each grammar database includes the names of entities (i.e., nouns) commonly found in speech about the particular domain to which the grammar database relates, whereas the lexical information is personalized to the user and/or the device 110 from which the user input originated. For example, a grammar database associated with a shopping domain may include a database of words commonly used when people discuss shopping.

Each recognizer 363 may also include an intent classification (IC) component 364. An IC component 364 parses ASR data to determine an intent(s) (associated with the domain associated with the recognizer 363 implementing the IC component 364) that potentially represents the user input. An intent represents to an action a user desires be performed. An IC component 364 may communicate with a database of words linked to intents. For example, a music intent database may link words and phrases such as "quiet," "volume off," and "mute" to a <Mute> intent. An IC component 364 identifies potential intents by comparing words and phrases in ASR data (representing at least a portion of the user input) to the words and phrases in an intents database (associated with the domain that is associated with the recognizer 363 implementing the IC component 364).

The intents identifiable by a specific IC component 364 are linked to domain-specific (i.e., the domain associated with the recognizer 363 implementing the IC component 364) grammar frameworks with "slots" to be filled. Each slot of a grammar framework corresponds to a portion of ASR data that the system believes corresponds to an entity. For example, a grammar framework corresponding to a <PlayMusic> intent may correspond to ASR data sentence structures such as "Play {Artist Name}," "Play {Album Name}," "Play {Song name}," "Play {Song name} by {Artist Name}," etc. However, to make entity resolution more flexible, grammar frameworks may not be structured as sentences, but rather based on associating slots with grammatical tags.

For example, an NER component 362 may parse ASR data to identify words as subject, object, verb, preposition, etc. based on grammar rules and/or models prior to recognizing named entities in the ASR data. An IC component 364 (implemented by the same recognizer 363 as the NER component 362) may use the identified verb to identify an intent. The NER component 362 may then determine a grammar model associated with the identified intent. For example, a grammar model for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the domain associated with the recognizer 363 implementing the NER component 362), attempting to match words and phrases in ASR data the NER component 362 previously tagged as a grammatical object or object modifier with those identified in the lexicon.

An NER component 362 may perform semantic tagging, which is the labeling of a word or combination of words according to their type/semantic meaning. An NER component 362 may parse ASR data using heuristic grammar rules, or a model may be constructed using techniques such as Hidden Markov Models, maximum entropy models, log linear models, conditional random fields (CRF), and the like. For example, an NER component 362 implemented by a music domain recognizer may parse and tag ASR data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer) may determine corresponds to a <PlayMusic> intent. At this stage, no determination has been made as to the meaning of "mother's little helper" or "the rolling stones," but based on grammar rules and models, the NER component 362 has determined the text of these phrases relates to the grammatical object (i.e., entity) of the user input represented in the ASR data.

An NER component 362 may tag ASR data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

The shortlister component 350 may receive ASR data 410 output from the ASR component 150 or output from the device 110b. The ASR component 150 may embed the ASR data 410 into a form processable by a trained model(s) using sentence embedding techniques as known in the art. Sentence embedding results in the ASR data 410 including text in a structure that enables the trained models of the shortlister component 350 to operate on the ASR data 410. For example, an embedding of the ASR data 410 may be a vector representation of the ASR data 410.

The shortlister component 350 may make binary determinations (e.g., yes or no) regarding which domains relate to the ASR data 410. The shortlister component 350 may make such determinations using the one or more trained models described herein above. If the shortlister component 350 implements a single trained model for each domain, the shortlister component 350 may simply run the models that are associated with enabled domains as indicated in a user profile associated with the device 110 and/or user that originated the user input.

The shortlister component 350 may generate N-best list data 415 representing domains that may execute with respect to the user input represented in the ASR data 410. The size of the N-best list represented in the N-best list data 415 is configurable. In an example, the N-best list data 415 may indicate every domain of the system as well as contain an indication, for each domain, regarding whether the domain is likely capable to execute the user input represented in the ASR data 410. In another example, instead of indicating every domain of the system, the N-best list data 415 may only indicate the domains that are likely to be able to execute the user input represented in the ASR data 410. In yet another example, the shortlister component 350 may implement thresholding such that the N-best list data 415 may indicate no more than a maximum number of domains that may execute the user input represented in the ASR data 410. In an example, the threshold number of domains that may be represented in the N-best list data 415 is ten. In another example, the domains included in the N-best list data 415 may be limited by a threshold a score, where only domains indicating a likelihood to handle the user input is above a certain score (as determined by processing the ASR data 410 by the shortlister component 350 relative to such domains) are included in the N-best list data 415.

The ASR data 410 may correspond to more than one ASR hypothesis. When this occurs, the shortlister component 350 may output a different N-best list (represented in the N-best list data 415) for each ASR hypothesis. Alternatively, the shortlister component 350 may output a single N-best list representing the domains that are related to the multiple ASR hypotheses represented in the ASR data 410.

As indicated above, the shortlister component 350 may implement thresholding such that an N-best list output therefrom may include no more than a threshold number of entries. If the ASR data 410 includes more than one ASR hypothesis, the N-best list output by the shortlister component 350 may include no more than a threshold number of entries irrespective of the number of ASR hypotheses output by the ASR component 150. Alternatively or in addition, the N-best list output by the shortlister component 350 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR data 410, the shortlister component 350 may generate confidence scores representing likelihoods that domains relate to the ASR data 410. If the shortlister component 350 implements a different trained model for each domain, the shortlister component 350 may generate a different confidence score for each individual domain trained model that is run. If the shortlister component 350 runs the models of every domain when ASR data 410 is received, the shortlister component 350 may generate a different confidence score for each domain of the system. If the shortlister component 350 runs the models of only the domains that are associated with skills indicated as enabled in a user profile associated with the device 110 and/or user that originated the user input, the shortlister component 350 may only generate a different confidence score for each domain associated with at least one enabled skill. If the shortlister component 350 implements a single trained model with domain specifically trained portions, the shortlister component 350 may generate a different confidence score for each domain who's specifically trained portion is run. The shortlister component 350 may perform matrix vector modification to obtain confidence scores for all domains of the system in a single instance of processing of the ASR data 410.

N-best list data 415 including confidence scores that may be output by the shortlister component 350 may be represented as, for example:

Search domain, 0.67
Recipe domain, 0.62
Information domain, 0.57
Shopping domain, 0.42

As indicated, the confidence scores output by the shortlister component 350 may be numeric values. The confidence scores output by the shortlister component 350 may alternatively be binned values (e.g., high, medium, low).

The N-best list may only include entries for domains having a confidence score satisfying (e.g., equaling or exceeding) a minimum threshold confidence score. Alternatively, the shortlister component 350 may include entries for all domains associated with user enabled skills, even if one or more of the domains are associated with confidence scores that do not satisfy the minimum threshold confidence score.

The shortlister component 350 may consider other data 420 when determining which domains may relate to the user input represented in the ASR data 410 as well as respective confidence scores. The other data 420 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 420 may include an indicator of the user associated with the ASR data 410, for example as determined by the user recognition component 195.

The other data 420 may be character embedded prior to being input to the shortlister component 350. The other data 420 may alternatively be embedded using other techniques known in the art prior to being input to the shortlister component 350.

The other data 420 may also include data indicating the domains associated with skills that are enabled with respect to the device 110 and/or user that originated the user input. The shortlister component 350 may use such data to determine which domain-specific trained models to run. That is, the shortlister component 350 may determine to only run the trained models associated with domains that are associated with user-enabled skills. The shortlister component 350 may alternatively use such data to alter confidence scores of domains.

As an example, considering two domains, a first domain associated with at least one enabled skill and a second domain not associated with any user-enabled skills of the user that originated the user input, the shortlister component 350 may run a first model specific to the first domain as well as a second model specific to the second domain. Alternatively, the shortlister component 350 may run a model configured to determine a score for each of the first and second domains. The shortlister component 350 may determine a same confidence score for each of the first and second domains in the first instance. The shortlister component 350 may then alter those confidence scores based on which domains is associated with at least one skill enabled by the present user. For example, the shortlister component 350 may increase the confidence score associated with the domain associated with at least one enabled skill while leaving the confidence score associated with the other domain the same. Alternatively, the shortlister component 350 may leave the confidence score associated with the domain associated with at least one enabled skill the same while decreasing the confidence score associated with the other domain. Moreover, the shortlister component 350 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 170. When the shortlister component 350 receives the ASR data 410, the shorlister component 350 may determine whether profile data associated with the user and/or device 110 that originated the command includes an indication of enabled skills.

The other data 420 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such data to determine which domain-specific trained models to run. For example, if the device 110 corresponds to a displayless type device, the shortlister component 350 may determine not to run trained models specific to domains that output video data. The shortlister component 350 may alternatively use such data to alter confidence scores of domains.

As an example, considering two domains, one that outputs audio data and another that outputs video data, the shortlister component 350 may run a first model specific to the domain that generates audio data as well as a second model specific to the domain that generates video data. Alternatively the shortlister component 350 may run a model configured to determine a score for each domain. The shortlister component 350 may determine a same confidence score for each of the domains in the first instance. The shortlister component 350 may then alter the original confidence scores based on the type of the device 110 that originated the user input corresponding to the ASR data 410. For example, if the device 110 is a displayless device, the shortlister component 350 may increase the confidence score associated with the domain that generates audio data while leaving the confidence score associated with the domain that generates video data the same. Alternatively, if the device 110 is a displayless device, the shortlister component 350 may leave the confidence score associated with the domain that generates audio data the same while decreasing the confidence score associated with the domain that generates video data. Moreover, if the device 110 is a displayless device, the shortlister component 350 may increase the confidence score associated with the domain that generates audio data as well as decrease the confidence score associated with the domain that generates video data.

The type of device information represented in the other data 420 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 420 may represent the smart TV of other display device, and not the displayless device that captured the spoken user input.

The other data 420 may also include data indicating the user input originating device's speed, location, or other mobility information. For example, the device may correspond to a vehicle including a display. If the vehicle is moving, the shortlister component 350 may decrease the confidence score associated with a domain that generates video data as it may be undesirable to output video content to a user while the user is driving. The device may output data to the system(s) 120 indicating when the device is moving.

The other data 420 may also include data indicating a currently invoked domain. For example, a user may speak a first (e.g., a previous) user input causing the system to invoke an music domain skill to output music to the user. As the system is outputting music to the user, the system may receive a second (e.g., the current) user input. The shortlister component 350 may use such data to alter confidence scores of domains. For example, the shortlister component 350 may run a first model specific to a first domain as well as a second model specific to a second domain. Alternatively, the shortlister component 350 may run a model configured to determine a score for each domain. The shortlister component 350 may also determine a same confidence score for each of the domains in the first instance. The shortlister component 350 may then alter the original confidence scores based on the first domain being invoked to cause the system to output content while the current user input was received. Based on the first domain being invoked, the shortlister component 350 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the N-best list data 415 generated by the shortlister component 350 as well as the different types of other data 420 considered by the shortlister component 350 are configurable. For example, the shortlister component 350 may update confidence scores as more other data 420 is considered. For further example, the N-best list data 415 may exclude relevant domains if thresholding is implemented. Thus, for example, the shortlister component 350 may include an indication of a domain in the N-best list 415 unless the shortlister component 350 is one hundred percent confident that the domain may not execute the user input represented in the ASR data 410 (e.g., the shortlister component 350 determines a confidence score of zero for the domain).

The shortlister component 350 may send the ASR data 410 to recognizers 363 associated with domains represented in the N-best list data 415. Alternatively, the shortlister component 350 may send the N-best list data 415 or some other indicator of the selected subset of domains to another component (such as the orchestrator component 130) which may in turn send the ASR data 410 to the recognizers 363 corresponding to the domains included in the N-best list data 415 or otherwise indicated in the indicator. If the shortlister component 350 generates an N-best list representing domains without any associated confidence scores, the shortlister component 350/orchestrator component 130 may send the ASR data 410 to recognizers 363 associated with domains that the shortlister component 350 determines may execute the user input. If the shortlister component 350 generates an N-best list representing domains with associated confidence scores, the shortlister component 350/orchestrator component 130 may send the ASR data 410 to recognizers 363 associated with domains associated with confidence scores satisfying (e.g., meeting or exceeding) a threshold minimum confidence score.

A recognizer 363 may output tagged ASR data generated by an NER component 362 and an IC component 364, as described herein above. The NLU component 160 may compile the output tagged ASR data of the recognizers 363 into a single cross-domain N-best list 440 and may send the cross-domain N-best list 440 to a pruning component 450. Each entry of tagged text (e.g., each NLU hypothesis) represented in the cross-domain N-best list data 440 may be associated with a respective score indicating a likelihood that the NLU hypothesis corresponds to the domain associated with the recognizer 363 from which the NLU hypothesis was output. For example, the cross-domain N-best list data 440 may be represented as (with each line corresponding to a different NLU hypothesis):

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 450 may sort the NLU hypotheses represented in the cross-domain N-best list data 440 according to their respective scores. The pruning component 450 may perform score thresholding with respect to the cross-domain NLU hypotheses. For example, the pruning component 450 may select NLU hypotheses associated with scores satisfying (e.g., meeting and/or exceeding) a threshold score. The pruning component 450 may also or alternatively perform number of NLU hypothesis thresholding. For example, the pruning component 450 may select the top scoring NLU hypothesis(es). The pruning component 450 may output a portion of the NLU hypotheses input thereto. The purpose of the pruning component 450 is to create a reduced list of NLU hypotheses so that downstream, more resource intensive, processes may only operate on the NLU hypotheses that most likely represent the user's intent.

The NLU component 160 may include a light slot filler component 452. The light slot filler component 452 can take text from slots represented in the NLU hypotheses output by the pruning component 450 and alter them to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain N-best list data 460.

Figure 4:
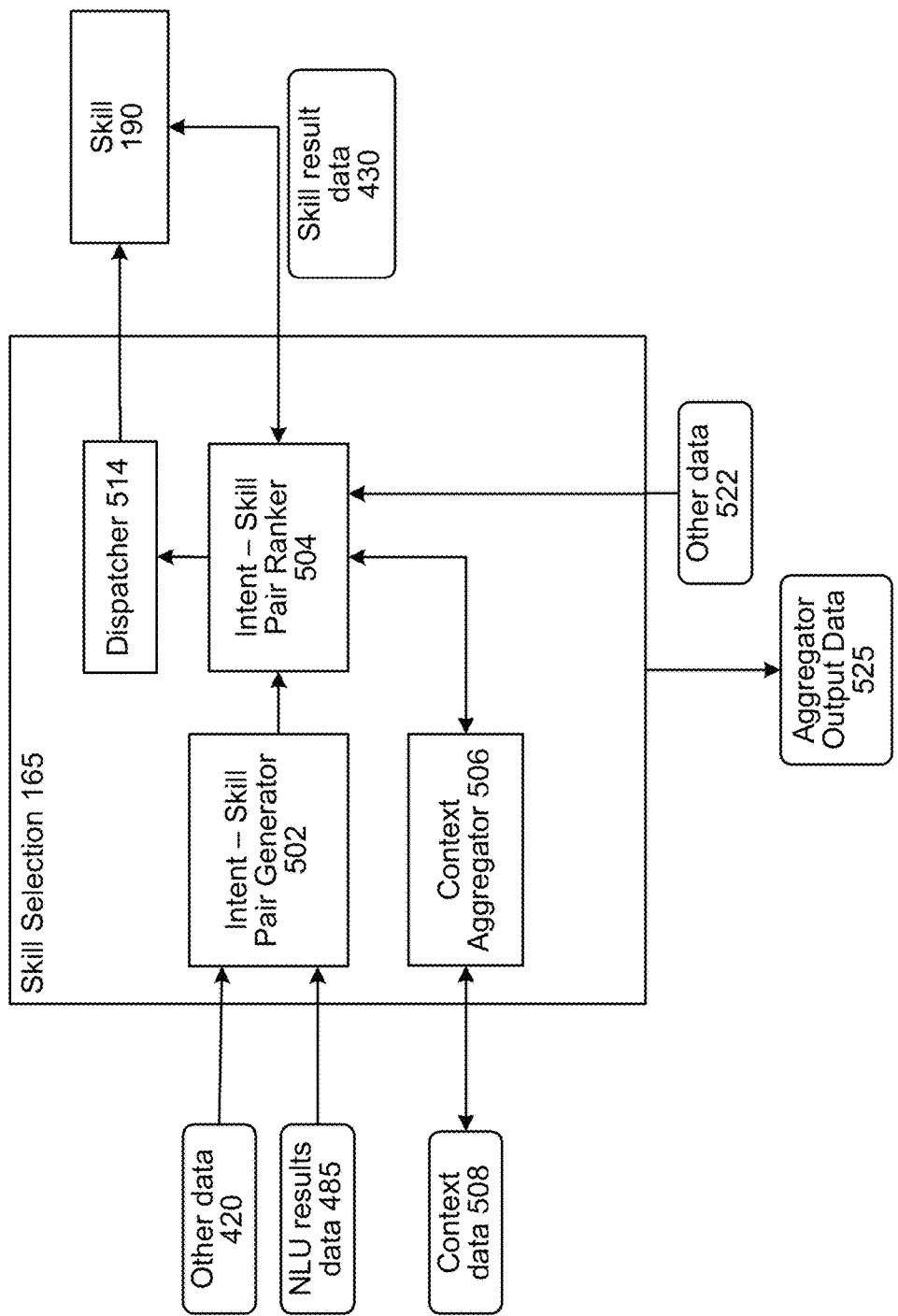
FIG. 4 is a conceptual diagram illustrating how a post-NLU ranker may process, according to embodiments of the present disclosure.

As shown in FIGS. 1 and 4, the ER component 162 may be implemented outside of the NLU component 160. In other embodiments, the ER component 162 may be included in the NLU component 160. The cross-domain N-best list data 460 may be input to the ER component 162. The ER component 162 can apply rules or other instructions to standardize labels or tokens from previous stages into an intent/slot representation. The precise transformation may depend on the domain. For example, for a travel domain, the ER component 162 may transform ASR data corresponding to "Boston airport" to the standard BOS three-letter code referring to the airport. The ER component 162 can refer to a knowledge base that is used to specifically identify the precise entity referred to in each slot of each NLU hypothesis represented in the cross-domain N-best list data 460. As described above, the ER component 162 can also refer to an entity provider component to identify the precise entity referred to in each slot of each NLU hypothesis in the cross-domain N-best list data 460. Specific intent/slot combinations may also be tied to a particular source, which may then be used to resolve the text. In the example "play songs by the stones," the ER component 162 may reference an entity provider component 152 corresponding to a personal music catalog, Amazon Music account, a user profile, or the like. In some embodiments, the ER component 162 may output an altered N-best list that is based on the cross-domain N-best list 460 but that includes the preliminary search results (e.g., entity IDs) for the specific entities mentioned in the slots and/or more detailed slot data that can eventually be used to select a skill component. The NLU component 160 may include multiple ER components 162 and each ER component may be specific to one or more domains.

The NLU component 160 may include a reranker 490. The reranker 490 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the ER component 162.

The reranker 490 may apply re-scoring, biasing, or other techniques. The reranker 490 may consider not only the preliminary search results output by the ER component 162, but may also consider other data 491. The other data 491 may include a variety of information. For example, the other data 491 may include skill rating or popularity data. For example, if one skill has a high rating, the reranker 490 may increase the score of a NLU hypothesis that may be processed by the skill. The other data 491 may also include information about skills that have been enabled by the user that originated the user input. For example, the reranker 490 may assign higher scores to NLU hypothesis that may be processed by enabled skills than NLU hypothesis that may be processed by non-enabled skills. The other data 491 may also include data indicating user usage history, such as if the user that originated the user input regularly uses a particular skill or does so at particular times of day. The other data 491 may additionally include data indicating date, time, location, weather, type of device 110, user identifier, context, as well as other information. For example, the reranker 490 may consider when any particular skill is currently active (e.g., music being played, a game being played, etc.).

As illustrated and described, the ER component 162 is implemented prior to the reranker 490. The ER component 162 may alternatively be implemented after the reranker 490. Implementing the ER component 162 after the reranker 490 limits the NLU hypotheses processed by the ER component 162 to only those hypotheses that successfully pass through the reranker 490.

The reranker 490 may be a global reranker (e.g., one that is not specific to any particular domain). Alternatively, the NLU component 160 may implement one or more domain-specific rerankers. Each domain-specific reranker may rerank NLU hypotheses associated with the domain. Each domain-specific reranker may output an N-best list of reranked hypotheses (e.g., 5-10 hypotheses).

The NLU component 160 may perform NLU processing described above with respect to domains associated with skills wholly implemented as part of the system(s) 120 (e.g., designated 190 in FIG. 1). The NLU component 160 may separately perform NLU processing described above with respect to domains associated with skills that are at least partially implemented as part of the skill system(s) 125. In an example, the shortlister component 350 may only process with respect to these latter domains. Results of these two NLU processing paths may be merged into NLU output data 485, which may be sent to a skill selection component 165, which may be implemented by the system(s) 120.

The skill selection component 165 (which may also be referred to as a skill selection component) may include a statistical component that produces a ranked list of intent/skill pairs with associated confidence scores. Each confidence score may indicate an adequacy of the skill's execution of the intent with respect to NLU results data associated with the skill. The skill selection component 165 may operate one or more trained models configured to process the NLU results data 485 (including preliminary entity search results), skill result data 430, and the other data 420 in order to output ranked output data 425. The ranked output data 425 may include an N-best list where the NLU hypotheses in the NLU results data 485 are reordered such that the N-best list in the ranked output data 425 represents a prioritized list of skills to respond to a user input as determined by the skill selection component 165. The ranked output data 425 may also include (either as part of an N-best list or otherwise) individual respective scores corresponding to skills where each score indicates a probability that the skill (and/or its respective result data) corresponds to the user input.

The system may be configured with thousands, tens of thousands, etc. skills. The skill selection component 165 enables the system to better determine the best skill to execute the user input. For example, first and second NLU hypotheses in the NLU results data 485 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The skill selection component 165 (or other scheduling component such as orchestrator component 130) may solicit the first skill and the second skill to provide potential result data 430 based on the first NLU hypothesis and the second NLU hypothesis, respectively. For example, the skill selection component 165 may send the first NLU hypothesis to the first skill 190*a* along with a request for the first skill 190*a* to at least partially execute with respect to the first NLU hypothesis. The skill selection component 165 may also send the second NLU hypothesis to the second skill 190*b* along with a request for the second skill 190*b* to at least partially execute with respect to the second NLU hypothesis. The skill selection component 165 receives, from the first skill 190*a*, first result data 430*a* generated from the first skill 190*a*'s execution with respect to the first NLU hypothesis. The skill selection component 165 also receives, from the second skill 190*b*, second results data 430*b* generated from the second skill 190*b*'s execution with respect to the second NLU hypothesis.

The result data 430 may include various portions. For example, the result data 430 may include content (e.g., audio data, text data, and/or video data) to be output to a user. The result data 430 may also include a unique identifier used by the system(s) 120 and/or the skill system(s) 125 to locate the data to be output to a user. The result data 430 may also include an instruction. For example, if the user input corresponds to "turn on the light," the result data 430 may include an instruction causing the system to turn on a light associated with a profile of the device (110*a*/110*b*) and/or user.

The skill selection component 165 may consider the first result data 430*a* and the second result data 430*b* to alter the first confidence score and the second confidence score of the first NLU hypothesis and the second NLU hypothesis, respectively. That is, the skill selection component 165 may generate a third confidence score based on the first result data 430*a* and the first confidence score. The third confidence score may correspond to how likely the skill selection component 165 determines the first skill will correctly respond to the user input. The skill selection component 165 may also generate a fourth confidence score based on the second result data 430*b* and the second confidence score. One skilled in the art will appreciate that a first difference between the third confidence score and the fourth confidence score may be greater than a second difference between the first confidence score and the second confidence score. The skill selection component 165 may also consider the other data 420 to generate the third confidence score and the fourth confidence score. While it has been described that the skill selection component 165 may alter the confidence scores associated with first and second NLU hypotheses, one skilled in the art will appreciate that the skill selection component 165 may alter the confidence scores of more than two NLU hypotheses. The skill selection component 165 may select the result data 430 associated with the skill 190 with the highest altered confidence score to be the data output in response to the current user input. The skill selection component 165 may also consider ASR data 410 (corresponding to the user input and determined by the ASR component 150) to alter the NLU hypotheses confidence scores.

The orchestrator component 130 may, prior to sending the NLU results data 485 to the skill selection component 165, associate intents in the NLU hypotheses with skills 190. For example, if a NLU hypothesis includes a <PlayMusic> intent, the orchestrator component 130 may associate the NLU hypothesis with one or more skills 190 that can execute the <PlayMusic> intent. Thus, the orchestrator component 130 may send the NLU results data 485, including NLU hypotheses paired with skills 190, to the skill selection component 165. In response to ASR data 410 corresponding to "what should I do for dinner today," the orchestrator component 130 may generates pairs of skills 190 with associated NLU hypotheses corresponding to:

Skill 1/NLU hypothesis including <Help> intent
Skill 2/NLU hypothesis including <Order> intent
Skill 3/NLU hypothesis including <DishType> intent The skill selection component 165 queries each skill 190, paired with a NLU hypothesis in the NLU output data 485, to provide result data 430 based on the NLU hypothesis with which it is associated. That is, with respect to each skill, the skill selection component 165 colloquially asks the each skill "if given this NLU hypothesis, what would you do with it." According to the above example, the skill selection component 165 may send skills 190 the following data:

Skill 1: First NLU hypothesis including <Help> intent indicator
Skill 2: Second NLU hypothesis including <Order> intent indicator
Skill 3: Third NLU hypothesis including <DishType> intent indicator The skill selection component 165 may query each of the skills 190 in parallel or substantially in parallel.

A skill 190 may provide the skill selection component 165 with various data and indications in response to the skill selection component 165 soliciting the skill 190 for result data 430. A skill 190 may simply provide the skill selection component 165 with an indication of whether or not the skill can execute with respect to the NLU hypothesis it received. A skill 190 may also or alternatively provide the skill selection component 165 with output data generated based on the NLU hypothesis it received. In some situations, a skill 190 may need further information in addition to what is represented in the received NLU hypothesis to provide output data responsive to the user input. In these situations, the skill 190 may provide the skill selection component 165 with result data 430 indicating slots of a framework that the skill 190 further needs filled or entities that the skill 190 further needs resolved prior to the skill 190 being able to provided result data 430 responsive to the user input. The skill 190 may also provide the skill selection component 165 with an instruction and/or computer-generated speech indicating how the skill 190 recommends the system solicit further information needed by the skill 190. The skill 190 may further provide the skill selection component 165 with an indication of whether the skill 190 will have all needed information after the user provides additional information a single time, or whether the skill 190 will need the user to provide various kinds of additional information prior to the skill 190 having all needed information. According to the above example, skills 190 may provide the skill selection component 165 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 430 includes an indication provided by a skill 190 indicating whether or not the skill 190 can execute with respect to a NLU hypothesis; data generated by a skill 190 based on a NLU hypothesis; as well as an indication provided by a skill 190 indicating the skill 190 needs further information in addition to what is represented in the received NLU hypothesis.

The skill selection component 165 uses the result data 430 provided by the skills 190 to alter the NLU processing confidence scores generated by the reranker 490. That is, the skill selection component 165 uses the result data 430 provided by the queried skills 190 to create larger differences between the NLU processing confidence scores generated by the reranker 490. Without the skill selection component 165, the system may not be confident enough to determine an output in response to a user input, for example when the NLU hypotheses associated with multiple skills are too close for the system to confidently determine a single skill 190 to invoke to respond to the user input. For example, if the system does not implement the skill selection component 165, the system may not be able to determine whether to obtain output data from a general reference information skill or a medical information skill in response to a user input corresponding to "what is acne."

The skill selection component 165 may prefer skills 190 that provide result data 430 responsive to NLU hypotheses over skills 190 that provide result data 430 corresponding to an indication that further information is needed, as well as skills 190 that provide result data 430 indicating they can provide multiple responses to received NLU hypotheses. For example, the skill selection component 165 may generate a first score for a first skill 190a that is greater than the first skill's NLU confidence score based on the first skill 190a providing result data 430a including a response to a NLU hypothesis. For further example, the skill selection component 165 may generate a second score for a second skill 190b that is less than the second skill's NLU confidence score based on the second skill 190b providing result data 430b indicating further information is needed for the second skill 190b to provide a response to a NLU hypothesis. Yet further, for example, the skill selection component 165 may generate a third score for a third skill 190c that is less than the third skill's NLU confidence score based on the third skill 190c providing result data 430c indicating the third skill 190c can provide multiple responses to a NLU hypothesis.

The skill selection component 165 may consider other data 420 in determining scores. The other data 420 may include rankings associated with the queried skills 190. A ranking may be a system ranking or a user-specific ranking. A ranking may indicate a veracity of a skill from the perspective of one or more users of the system. For example, the skill selection component 165 may generate a first score for a first skill 190a that is greater than the first skill's NLU processing confidence score based on the first skill 190a being associated with a high ranking. For further example, the skill selection component 165 may generate a second score for a second skill 190b that is less than the second skill's NLU processing confidence score based on the second skill 190b being associated with a low ranking.

The other data 420 may include information indicating whether or not the user that originated the user input has enabled one or more of the queried skills 190. For example, the skill selection component 165 may generate a first score for a first skill 190a that is greater than the first skill's NLU processing confidence score based on the first skill 190a being enabled by the user that originated the user input. For further example, the skill selection component 165 may generate a second score for a second skill 190b that is less than the second skill's NLU processing confidence score based on the second skill 190b not being enabled by the user that originated the user input. When the skill selection component 165 receives the NLU results data 485, the skill selection component 165 may determine whether profile data, associated with the user and/or device that originated the user input, includes indications of enabled skills.

The other data 420 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the skill selection component 165 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the skill selection component 165 may increase the NLU processing confidence score associated with a first skill configured to output visual data and/or decrease the NLU processing confidence score associated with a second skill configured to output audio data.

The other data 420 may include information indicating the veracity of the result data 430 provided by a skill 190. For example, if a user says "tell me a recipe for pasta sauce," a first skill 190a may provide the skill selection component 165 with first result data 430a corresponding to a first recipe associated with a five star rating and a second skill 190b may provide the skill selection component 165 with second result data 430b corresponding to a second recipe associated with a one star rating. In this situation, the skill selection component 165 may increase the NLU processing confidence score associated with the first skill 190a based on the first skill 190a providing the first result data 430a associated with the five star rating and/or decrease the NLU processing confidence score associated with the second skill 190b based on the second skill 190b providing the second result data 430b associated with the one star rating.

The other data 420 may include information indicating the type of device that originated the user input. For example, the device may correspond to a "hotel room" type if the device is located in a hotel room. If a user inputs a command corresponding to "order me food" to the device located in the hotel room, the skill selection component 165 may increase the NLU processing confidence score associated with a first skill 190a corresponding to a room service skill associated with the hotel and/or decrease the NLU processing confidence score associated with a second skill 190b corresponding to a food skill not associated with the hotel.

The other data 420 may include information indicating a location of the device and/or user that originated the user input. The system may be configured with skills 190 that may only operate with respect to certain geographic locations. For example, a user may provide a user input corresponding to "when is the next train to Portland." A first skill 190a may operate with respect to trains that arrive at, depart from, and pass through Portland, Oregon. A second skill 190b may operate with respect to trains that arrive at, depart from, and pass through Portland, Maine. If the device and/or user that originated the user input is located in Seattle, Washington, the skill selection component 165 may increase the NLU processing confidence score associated with the first skill 190a and/or decrease the NLU processing confidence score associated with the second skill 190b. Likewise, if the device and/or user that originated the user input is located in Boston, Massachusetts, the skill selection component 165 may increase the NLU processing confidence score associated with the second skill 190b and/or decrease the NLU processing confidence score associated with the first skill 190a.

The other data 420 may include information indicating a time of day. The system may be configured with skills 190 that operate with respect to certain times of day. For example, a user may provide a user input corresponding to "order me food." A first skill 190a may generate first result data 430a corresponding to breakfast. A second skill 190b may generate second result data 430b corresponding to dinner. If the system(s) 120 receives the user input in the morning, the skill selection component 165 may increase the NLU processing confidence score associated with the first skill 190a and/or decrease the NLU processing score associated with the second skill 190b. If the system(s) 120 receives the user input in the afternoon or evening, the skill selection component 165 may increase the NLU processing confidence score associated with the second skill 190b and/or decrease the NLU processing confidence score associated with the first skill 190a.

The other data 420 may include information indicating user preferences. The system may include multiple skills 190 configured to execute in substantially the same manner. For example, a first skill 190a and a second skill 190b may both be configured to order food from respective restaurants. The system may store a user preference (e.g., in the profile storage 170) that is associated with the user that provided the user input to the system(s) 120 as well as indicates the user prefers the first skill 190a over the second skill 190b. Thus, when the user provides a user input that may be executed by both the first skill 190a and the second skill 190b, the skill selection component 165 may increase the NLU processing confidence score associated with the first skill 190a and/or decrease the NLU processing confidence score associated with the second skill 190b.

The other data 420 may include information indicating system usage history associated with the user that originated the user input. For example, the system usage history may indicate the user originates user inputs that invoke a first skill 190a more often than the user originates user inputs that invoke a second skill 190b. Based on this, if the present user input may be executed by both the first skill 190a and the second skill 190b, the skill selection component 165 may increase the NLU processing confidence score associated with the first skill 190a and/or decrease the NLU processing confidence score associated with the second skill 190b.

The other data 420 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the skill selection component 165 may increase the NLU processing confidence score associated with a first skill 190a that generates audio data. The skill selection component 165 may also or alternatively decrease the NLU processing confidence score associated with a second skill 190b that generates image data or video data.

The other data 420 may include information indicating how long it took a skill 190 to provide result data 430 to the skill selection component 165. When the skill selection component 165 multiple skills 190 for result data 430, the skills 190 may respond to the queries at different speeds. The skill selection component 165 may implement a latency budget. For example, if the skill selection component 165 determines a skill 190 responds to the skill selection component 165 within a threshold amount of time from receiving a query from the skill selection component 165, the skill selection component 165 may increase the NLU processing confidence score associated with the skill 190. Conversely, if the skill selection component 165 determines a skill 190 does not respond to the skill selection component 165 within a threshold amount of time from receiving a query from the skill selection component 165, the skill selection component 165 may decrease the NLU processing confidence score associated with the skill 190.

It has been described that the skill selection component 165 uses the other data 420 to increase and decrease NLU processing confidence scores associated with various skills 190 that the skill selection component 165 has already requested result data from. Alternatively, the skill selection component 165 may use the other data 420 to determine which skills 190 to request result data from. For example, the skill selection component 165 may use the other data 420 to increase and/or decrease NLU processing confidence scores associated with skills 190 associated with the NLU results data 485 output by the NLU component 160. The skill selection component 165 may select n-number of top scoring altered NLU processing confidence scores. The skill selection component 165 may then request result data 430 from only the skills 190 associated with the selected n-number of NLU processing confidence scores.

As described, the skill selection component 165 may request result data 430 from all skills 190 associated with the NLU results data 485 output by the NLU component 160. Alternatively, the system(s) 120 may prefer result data 430 from skills implemented entirely by the system(s) 120 rather than skills at least partially implemented by the skill system(s) 125. Therefore, in the first instance, the skill selection component 165 may request result data 430 from only skills associated with the NLU results data 485 and entirely implemented by the system(s) 120. The skill selection component 165 may only request result data 430 from skills associated with the NLU results data 485, and at least partially implemented by the skill system(s) 125, if none of the skills, wholly implemented by the system(s) 120, provide the skill selection component 165 with result data 430 indicating either data response to the NLU results data 485, an indication that the skill can execute the user input, or an indication that further information is needed.

As indicated above, the skill selection component 165 may request result data 430 from multiple skills 190. If one of the skills 190 provides result data 430 indicating a response to a NLU hypothesis and the other skills provide result data 430 indicating either they cannot execute or they need further information, the skill selection component 165 may select the result data 430 including the response to the NLU hypothesis as the data to be output to the user. If more than one of the skills 190 provides result data 430 indicating responses to NLU hypotheses, the skill selection component 165 may consider the other data 420 to generate altered NLU processing confidence scores, and select the result data 430 of the skill associated with the greatest score as the data to be output to the user.

A system that does not implement the skill selection component 165 may select the highest scored NLU hypothesis in the NLU results data 485. The system may send the NLU hypothesis to a skill 190 associated therewith along with a request for output data. In some situations, the skill 190 may not be able to provide the system with output data. This results in the system indicating to the user that the user input could not be processed even though another skill associated with lower ranked NLU hypothesis could have provided output data responsive to the user input.

The skill selection component 165 reduces instances of the aforementioned situation. As described, the skill selection component 165 queries multiple skills associated with the NLU results data 485 to provide result data 430 to the skill selection component 165 prior to the skill selection component 165 ultimately determining the skill 190 to be invoked to respond to the user input. Some of the skills 190 may provide result data 430 indicating responses to NLU hypotheses while other skills 190 may providing result data 430 indicating the skills cannot provide responsive data. Whereas a system not implementing the skill selection component 165 may select one of the skills 190 that could not provide a response, the skill selection component 165 only selects a skill 190 that provides the skill selection component 165 with result data corresponding to a response, indicating further information is needed, or indicating multiple responses can be generated.

The skill selection component 165 may select result data 430, associated with the skill 190 associated with the highest score, for output to the user. Alternatively, the skill selection component 165 may output ranked output data 425 indicating skills 190 and their respective post-NLU ranker rankings. Since the skill selection component 165 receives result data 430, potentially corresponding to a response to the user input, from the skills 190 prior to skill selection component 165 selecting one of the skills or outputting the ranked output data 425, little to no latency occurs from the time skills provide result data 430 and the time the system outputs responds to the user.

If the skill selection component 165 selects result audio data to be output to a user and the system determines content should be output audibly, the skill selection component 165 (or another component of the system(s) 120) may cause the device 110a and/or the device 110b to output audio corresponding to the result audio data. If the skill selection component 165 selects result text data to output to a user and the system determines content should be output visually, the skill selection component 165 (or another component of the system(s) 120) may cause the device 110b to display text corresponding to the result text data. If the skill selection component 165 selects result audio data to output to a user and the system determines content should be output visually, the skill selection component 165 (or another component of the system(s) 120) may send the result audio data to the ASR component 150. The ASR component 150 may generate output ASR data corresponding to the result audio data. The system(s) 120 may then cause the device 110b to display text corresponding to the output ASR data. If the skill selection component 165 selects result text data to output to a user and the system determines content should be output audibly, the skill selection component 165 (or another component of the system(s) 120) may send the result text data to the TTS component 180. The TTS component 180 may generate output audio data (corresponding to computer-generated speech) based on the result text data. The system(s) 120 may then cause the device 110a and/or the device 110b to output audio corresponding to the output audio data.

As described, a skill 190 may provide result data 430 either indicating a response to the user input, indicating more information is needed for the skill 190 to provide a response to the user input, or indicating the skill 190 cannot provide a response to the user input. If the skill 190 associated with the highest post-NLU ranker score provides the skill selection component 165 with result data 430 indicating a response to the user input, the skill selection component 165 (or another component of the system(s) 120, such as the orchestrator component 130) may simply cause content corresponding to the result data 430 to be output to the user. For example, the skill selection component 165 may send the result data 430 to the orchestrator component 130. The orchestrator component 130 may cause the result data 430 to be sent to the device (110a/110b), which may output audio and/or display text corresponding to the result data 430. The orchestrator component 130 may send the result data 430 to the ASR component 150 to generate output text data and/or may send the result data 430 to the TTS component 180 to generate output audio data, depending on the situation.

The skill 190 associated with the highest post-NLU ranker score may provide the skill selection component 165 with result data 430 indicating more information is needed as well as instruction data. The instruction data may indicate how the skill 190 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the skill selection component 165 may simply cause the received instruction data be output by the device (110a/110b). Alternatively, the instruction data may be in a format that is not capable of being output by the device (110a/110b). When this occurs, the skill selection component 165 may cause the ASR component 150 or the TTS component 180 to process the instruction data, depending on the situation, to generate instruction data that may be output by the device (110a/110b). Once the user provides the system with all further information needed by the skill 190, the skill 190 may provide the system with result data 430 indicating a response to the user input, which may be output by the system as detailed above.

The system may include "informational" skills 190 that simply provide the system with information, which the system outputs to the user. The system may also include "transactional" skills 190 that require a system instruction to execute the user input. Transactional skills 190 include ride sharing skills, flight booking skills, etc. A transactional skill 190 may simply provide the skill selection component 165 with result data 430 indicating the transactional skill 190 can execute the user input. The skill selection component 165 may then cause the system to solicit the user for an indication that the system is permitted to cause the transactional skill 190 to execute the user input. The user-provided indication may be an audible indication or a tactile indication (e.g., activation of a virtual button or input of text via a virtual keyboard). In response to receiving the user-provided indication, the system may provide the transactional skill 190 with data corresponding to the indication. In response, the transactional skill 190 may execute the command (e.g., book a flight, book a train ticket, etc.). Thus, while the system may not further engage an informational skill 190 after the informational skill 190 provides the skill selection component 165 with result data 430, the system may further engage a transactional skill 190 after the transactional skill 190 provides the skill selection component 165 with result data 430 indicating the transactional skill 190 may execute the user input.

In some instances, the skill selection component 165 may generate respective scores for first and second skills that are too close (e.g., are not different by at least a threshold difference) for the skill selection component 165 to make a confident determination regarding which skill should execute the user input. When this occurs, the system may request the user indicate which skill the user prefers to execute the user input. The system may output TTS-generated speech to the user to solicit which skill the user wants to execute the user input.

FIG. 4 illustrates other configurations and operations of the skill selection component 165. When the skill selection component 165 receives NLU results data 485 and the other data 420, the NLU results data 485 and the other data 420 may be sent to an intent-skill pair generator 502. The intent-skill pair generator 502 may include information about what skills are capable of handling what intents. Such information may be context agnostic, and may thus indicate what skills are capable of handling what intents generally, without regard to the context associated with the user input. The intent-skill pair generator 502 thus receives the NLU results data 485 and identifies what particular candidate skills may handle the intent for NLU hypothesis. For example, if a NLU hypothesis includes a particular intent, the intent-skill pair generator 502 identifies each skill that may execute with respect to the intent. For further example, if the NLU results data 485 include multiple NLU hypotheses including multiple intents, the intent-skill pair generator 502 associates each different NLU hypothesis with each skill that may execute with respect to the NLU hypothesis. As illustrated, the intent-skill pair generator 502 may be implemented at part of the skill selection component 165. However, one skilled in the art will appreciate that the intent-skill pair generator 502 may be implemented as part of the NLU component 160 or in another component without departing from the present disclosure. In such a case, the NLU results data 485 may include intent-skill pairs.

The skill selection component 165 may also include an intent-skill pair ranker 504. The intent-skill pair ranker 504 ranks the intent-skill pairs generated by the intent-skill pair generator 502 based on, for example, the number of filled slots of a NLU hypothesis, an NLU confidence score associated with a NLU hypothesis, context information output by a context aggregator 506, and/or other data.

The skill selection component 165 may include the context aggregator 506. The context aggregator 506 receives context data 508 from various contextual sources. The context data 508 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 506 may aggregate the context data 508 and put the context data 508 in a form that can be processed by the intent-skill pair ranker 504. Context data 508 may include data obtained from the device 110 or from other services connected to the system(s) 120.

The context data 508 may include skill availability data. Such information may indicate what skills are available and authorized to process the user input. For example, if the user has only enabled certain skills, the enabled skills may be noted in the skill availability data.

The context data 508 may also include dialog data. A "dialog" or "dialog session" as used herein may refer to data transmissions (such as relating to multiple user inputs and system(s) 120 outputs) between the system(s) 120 and a local device (e.g., the device 110) that all relate to a single originating user input. Thus, the data transmissions of a dialog session may share a dialog identifier or other unique identifier that may be used by the orchestrator component 130, skill(s) 190, skill server(s) 125, etc. to track information across the dialog session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog session related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog session may or may not start with speaking of a wakeword. Each user input of a dialog may be associated with a unique user input identifier such that multiple user input identifiers may be associated with a single dialog session identifier.

Dialog data may include interactive focus information, (e.g., representing which skill was most recently invoked to execute a previous user input for the user and/or device 110 associated with the present user input). Dialog data may also include content focus information (e.g., representing a skill that is streaming data to the device 110 when the data corresponding to the current user input is received by the system(s) 120). The context data 508 may be one portion of the data used by the intent-skill pair ranker 504 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 508 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 508 (and/or other data 522) may include a metadata flag/indicator that represents whether the particular skill being executed is one that can handle a go-back (or other navigational) request.

The context data 508 may also include user profile data. The user profile data may represent preferences and/or characteristics of the user that originated the current user input. Such data may be received from the profile storage 170.

The context data 508 may also include location data. The location data may represent a location of the device 110 from which the user input was received.

The context data 508 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

The context data 508 may also include data regarding whether one or more skills are "in focus." A skill may be in interactive focus, meaning the skill was the most recent skill that executed a user input for a user or device associated with a present user input and/or the skill may be involved with an open dialog (e.g., series of user inputs and responses) with a user device. Interactive focus attempts to continue a conversation between a user and the system and/or a skill for purposes of processing the dialog. However, there may be instances where a user inputs a command that may be handled by a skill that is currently in interactive focus, but which the user does not intend to be executed by such skill. The system may process the context data 508 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 508 may also include other context data not explicitly recited herein.

The intent-skill pair ranker 504 may operate one or more trained models that are configured to process the NLU results data 485, skill result data 430, and other data 522 in order to determine a single best skill for executing the current user input from the available pairs output by the intent-skill pair generator 502. The intent-skill pair ranker 504 may send queries to the skills and request a first skill and a second skill (for example the candidate skills identified by the pair generator 502), to provide potential result data indicating whether the skill can handle the intent at the particular moment and if so, what the output data for the particular skill would be (e.g., data the skill would provide to a user if the skill were selected to execute the user input) based on the NLU results data 485. For example, the intent-skill pair ranker 504 may send a first NLU hypothesis, associated with a first skill, to the first skill along with a request for the first skill to at least partially execute with respect to the first NLU hypothesis. The intent-skill pair ranker 504 may also send a second NLU hypothesis, associated with the second skill, to the second skill along with a request for the second skill to at least partially execute with respect to the second NLU hypothesis. The intent-skill pair ranker 504 receives, from the first skill, first result data 430a generated from the first skill's execution with respect to the first NLU hypothesis. The intent-skill pair ranker 504 also receives, from the second skill, second results data 430b generated from the second skill's execution with respect to the second NLU hypothesis. Based on the first results data 430a, a first NLU confidence score associated with the first NLU hypothesis, the second results data 430b, a second NLU confidence score associated with the second NLU hypothesis, and other data 522 (e.g., context data, user profile data, etc.), the intent-skill pair ranker 504 determines the best skill for executing the current user input. The intent-skill pair ranker 504 sends an indication of the best skill to a dispatcher component 514.

The dispatcher 514 may then send the selected skill the information needed to execute the user input, including an indication of the intent, the appropriate context data 508 (such as device identifier, user identifier, or the like), slot data, utterance identifier, dialog identifier, or any other information needed.

FIG. 5 is a signal flow diagram illustrating how the ER component 162 may process during the preliminary search stage. The NLU component 160 may send (550) an entity name and entity type for entity resolution to the ER component 162. As described above, the NLU component 160, using NER processing, may determine one or more portions of a user input that correspond to an entity and may determine a type of entity that portion of the user input corresponds to. As part of the preliminary search stage, the ER component 162 may send a command (552), to the entity provider component 164, to perform an entity search. The command may include one entity name and corresponding entity type received from the NLU component 160. If more than one entity name is received from the NLU component 160, then the ER component 162 may send a separate search command for each entity name and corresponding entity type. The command may also include an identifier to associate with the search results. In some embodiments, the ER component 162 may not send the identifier to the entity provider component 164, and may instead associate the identifier to the search results received later from the entity provider component 164. In some embodiments, the preliminary search may be constrained with respect an amount of time (time constraint) that the entity provider component 164 can spend searching for entities. Alternatively or additionally, the preliminary search may be constrained with respect to an amount of data (data size limit) that the entity provider component 164 can include in the search results. In some embodiments, the ER component 162 may send the time constraint and/or the data size limit to the entity provider component 164 with the command to perform the preliminary search. In other embodiments, the time constraint and/or the data size limit may be pre-known/already stored by the entity provider component 164. In some embodiments, the preliminary search may be to determine whether at least one entity exists, at the entity provider component 164, corresponding to the entity name and entity type provided by the ER component 162.

The entity provider component 164 may determine (554) preliminary search results based on searching one or more of its entity database(s) for the entity name and entity type provided by the ER component 162. The preliminary search results may indicate to the ER component 162 whether or not at least one entity, corresponding to the entity name and entity type, is found. The preliminary search results may include information on the entity(ies) found to correspond to the entity name and entity type, such as an entity identifier for the entity and a confidence score indicating a likelihood of the entity matching the entity name and entity type. The preliminary search results may also include an indication that the search results are preliminary. In other embodiments, the ER component 162 may add the foregoing indication to the search results after receipt.

The entity provider component 164 may send (556) the preliminary search results to the ER component 162. The ER component 162 may store (558) the preliminary search results, associating the preliminary search results with the identifier, if not already associated. The ER component 162 may send (560) the preliminary search results to the NLU component 160. The NLU data may include intent data corresponding to the user input and entity data corresponding to the user input, where the entity data may include the entity name, the entity type, and the preliminary search results (including the identifier) corresponding to the entity name. The NLU component 160 may send (562) the NLU data including the preliminary search results to the skill selection component 165.

In some embodiments, the ER component 162 may send a separate command to perform a complete search in parallel to the skill selection component 165 performing its processing. In other words, components of the system 120 may process in parallel to the ER component 162 performing the complete search stage of the multi-stage ER processing.

In some embodiments, the command, sent by the ER component 162 to the entity provider component 164 at step 552, may indicate that the entity provider component 164 is to commence a complete search as soon as the preliminary search results are sent to the ER component 162 by the entity provider component 164. In such embodiments, the ER component 162 need not send a separate command to perform a complete entity search.

The command to perform a complete entity search may include the identifier, or the ER component 162 may associate the identifier with the complete search results upon receipt from the entity provider component 164. The complete entity search may involve the entity provider component 164 searching for entities based on other data and factors, rather than simply determining that an entity corresponding to the entity name exists. For example, during the complete entity search, the entity provider component 164 may take into consideration user profile data corresponding to the user input, where the user profile data may indicate one or more of a preference for an entity, a permission or authorization for a particular entity (e.g., via a music subscription, a video subscription, etc.), and/or other data. As a further example, the entity provider component 164 may also take into consideration information for the device 110, time information for when the user input is received, location information for the device 110/the user 105, and/or other data.

FIG. 6 is a signal flow diagram illustrating processing with respect to the complete entity search. In this example, the complete search results are determined and stored before the skill component 190 requests the complete search results. The entity provider component 164 may determine (602) complete search results for the entity name and entity type determined by the NLU component 160. If there are more than one entity name identified in the user input, the ER component 162 may send a separate request, for each entity name, for complete search results to the entity provider component 164. In parallel, the skill selection component 165 may determine (604) a skill component to respond to the user input. The skill selection component 165 may use the NLU data, including the preliminary search results, to determine the skill component.

The entity provider component 164 may send (606) the complete search results to the ER component 162. The complete search results may include information on the entity(ies) found to correspond to the entity name and entity type, such as an entity identifier for the entity and a confidence score indicating a likelihood of the entity matching the entity name and entity type. The complete search results may also include an indication that the search results are complete. In other embodiments, the ER component 162 may add the foregoing indication to the search results after receipt. The ER component 162 may store (608) the complete search results with the identifier. In some embodiments, the entity provider component 164 may include the identifier in the complete search results. In other embodiments, the ER component 162 may include the identifier with the complete search results when storing.

At some point, after its processing is complete, the skill selection component 165 may send a command (610) to the skill component 190 to respond to the user input. The skill selection component 165 may also send, to the skill component 190, the NLU data including the preliminary search results and the identifier associated with the preliminary search results. In some example cases, the skill component 190 may receive NLU data including preliminary search results from multiple different entity provider components, each of which may be associated with a different identifier.

The skill component 190 may determine that it needs complete entity search results to perform its processing (e.g., determine output data responsive to the user input). The skill component 190 may send (612) a request, to the ER component 162, for complete search results associated with the identifier. The identifier may refer to the preliminary search results for which the skill component 190 wants the complete search results. Using the identifier, the ER component 162 may identify and send (614) the complete search results to the skill component 190.

FIG. 7 is a signal flow diagram illustrating processing with respect to the complete entity search. In this example, the complete search results are determined and stored after the skill component 190 requests the complete search results. The skill selection component 165 may determine (702) a skill component to respond to the user input using the NLU data including the preliminary search results. The skill selection component 165 may send a command (704), to the skill component 190, to respond to the user input, along with the NLU data including the preliminary search results associated with the identifier.

While the skill selection component 165 is performing its processing, the entity provider component 164 may determine (706) the complete search results for the entity name and entity type provided by the ER component 162. In the meantime, the skill component 190 may send (708) a request, to the ER component 162, for complete search results associated with the identifier. The ER component 162 may determine that the complete search results have not been received yet (e.g., fail to determine search results indicated as "complete" and associated with the identifier in storage), and may wait (710) for the complete search results. The step 706 may occur between the steps 710 and 712, or the entity provider component 164 may finish performing the complete search after the step 708. At some point, the entity provider component 164 may send (712) the complete search results to the ER component 162. The ER component 162 may store (714) the complete search results associated with the identifier, and may send (716) the complete search results to the skill component 190, in response to the request received at the step 708.

In some embodiments, the entity provider component 164 may push search results as they are available based on searching portions of its database(s)/catalog(s). In some embodiments, the ER component 162 may not wait (at the step 710) for the entire search results from the entity provider component 164, and may send the search results the ER component 162 has already received from the entity provider component 164 in response to the request at the step 708 from the skill component 190.

In some embodiments, the entity provider component 164 may not send complete search results to the ER component 162 until the ER component 162 receives a request for the complete search results from the skill component 190. The ER component 162 may request complete search results from the entity provider component 164 based on the request (at the step 708) from the skill component 190.

FIG. 8 is a signal flow diagram illustrating an example where the requested complete search results are not determined within a time period, and the skill component performs other actions to retrieve complete entity search results. The skill selection component 165 may determine (802) a skill component to respond to the user input, using the NLU data including the preliminary search results. The skill selection component 165 may send a command (804) to respond to the user input to the skill component 190, along with the NLU data including the preliminary search results associated with the identifier. The skill component 190 may send (806), to the ER component 162, a request for complete search results associated with the identifier. In the meantime, the entity provider component 164 may determine (808) the complete search results for the entity name and entity type provided by the ER component 162. However, the skill component 190 may determine (810) that it has not received the complete search results within a period of time (timeout period) of sending the request to the ER component 162 at step 806.

The NLU data, received by the skill component 190, may include preliminary search results from multiple different entity provider components, each associated with a different identifier. In some cases, the skill component 190 may request complete search results from another entity provider component to reduce the delay in responding to the user input. Thus, based on the requested complete search results not being received within the period of time, the skill component 190 may send a request (812), to the ER component 162, for complete search results for another identifier. The ER component 162 may send (814) the complete search results for the other identifier, which may be received from another entity provider component (e.g., 152) for the same entity name and entity type as sent to the entity provider component 164.

In some cases, complete search results from another entity provider component may not be available at the ER component 162. For example, another entity provider component may not find any entities corresponding to the entity name and entity type, or the complete search results from the other entity provider component may not be received within a timeout period to send to the skill component 190. As a further example, the complete search results from the entity provider component (either 164 or another one) may indicate an error (e.g., "ER_Exception"). In such cases, the skill component 190 may output an error in response to the user input (e.g., synthesized speech representing "Sorry, I don't understand") or may request the user 105 to provide more information relating to the user input (e.g., request a rephrase of the user input, ask to confirm the entity name, etc.).

Figure 9A:
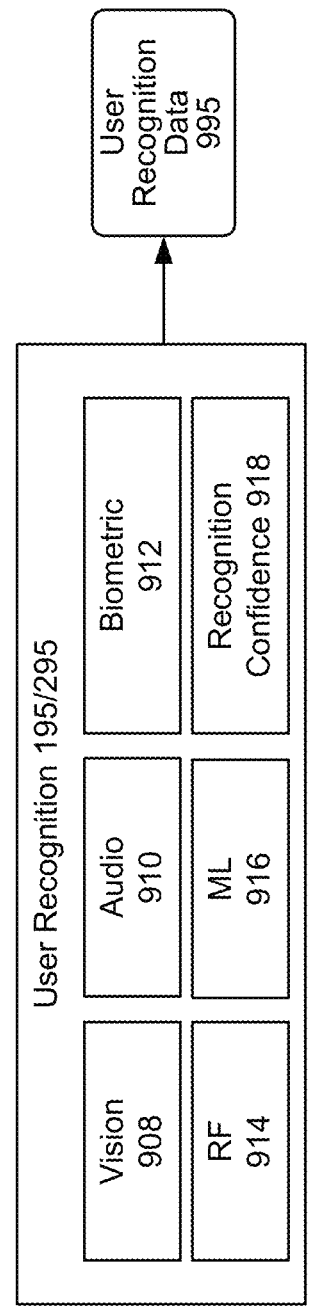
FIG. 9A is a schematic diagram of an illustrative architecture in which sensor data is combined to recognize one or more users, according to embodiments of the present disclosure.

The device 110 may include the user recognition component 295 and the system(s) 120 may include the user recognition component 195 that recognizes one or more users using a variety of data. As illustrated in FIG. 9A, the user recognition component 195/295 may include one or more subcomponents including a vision component 908, an audio component 910, a biometric component 912, a radio frequency (RF) component 914, a machine learning (ML) component 916, and a recognition confidence component 918. In some instances, the user recognition component 195/295 may monitor data and determinations from one or more subcomponents to determine an identity of one or more users associated with data input to the device 110 and/or the system(s) 120. The user recognition component 195/295 may output user recognition data 995, which may include a user identifier associated with a user the user recognition component 195/295 determines originated data input to the device 110 and/or the system(s) 120. The user recognition data 995 may be used to inform processes performed by various components of the device 110 and/or the system(s) 120.

The vision component 908 may receive data from one or more sensors capable of providing images (e.g., cameras) or sensors indicating motion (e.g., motion sensors). The vision component 908 can perform facial recognition or image analysis to determine an identity of a user and to associate that identity with a user profile associated with the user. In some instances, when a user is facing a camera, the vision component 908 may perform facial recognition and identify the user with a high degree of confidence. In other instances, the vision component 908 may have a low degree of confidence of an identity of a user, and the user recognition component 195/295 may utilize determinations from additional components to determine an identity of a user. The vision component 908 can be used in conjunction with other components to determine an identity of a user. For example, the user recognition component 195/295 may use data from the vision component 908 with data from the audio component 910 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 912. For example, the biometric component 912 may receive data corresponding to fingerprints, iris or retina scans, thermal scans, weights of users, a size of a user, pressure (e.g., within floor sensors), etc., and may determine a biometric profile corresponding to a user. The biometric component 912 may distinguish between a user and sound from a television, for example. Thus, the biometric component 912 may incorporate biometric information into a confidence level for determining an identity of a user. Biometric information output by the biometric component 912 can be associated with specific user profile data such that the biometric information uniquely identifies a user profile of a user.

The radio frequency (RF) component 914 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 914 the strength of the signal (e.g., as a received signal strength indication (RSSI)). The RF component 914 may use the RSSI to determine an identity of a user (with an associated confidence level). In some instances, the RF component 914 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 916 may track the behavior of various users as a factor in determining a confidence level of the identity of the user. By way of example, a user may adhere to a regular schedule such that the user is at a first location during the day (e.g., at work or at school). In this example, the ML component 916 would factor in past behavior and/or trends in determining the identity of the user that provided input to the device 110 and/or the system(s) 120. Thus, the ML component 916 may use historical data and/or usage patterns over time to increase or decrease a confidence level of an identity of a user.

In at least some instances, the recognition confidence component 918 receives determinations from the various components 908, 910, 912, 914, and 916, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 995.

The audio component 910 may receive data from one or more sensors capable of providing an audio signal (e.g., one or more microphones) to facilitate recognition of a user. The audio component 910 may perform audio recognition on an audio signal to determine an identity of the user and associated user identifier. In some instances, aspects of device 110 and/or the system(s) 120 may be configured at a computing device (e.g., a local server). Thus, in some instances, the audio component 910 operating on a computing device may analyze all sound to facilitate recognition of a user. In some instances, the audio component 910 may perform voice recognition to determine an identity of a user.

The audio component 910 may also perform user identification based on audio data 107 input into the device 110 and/or the system(s) 120 for speech processing. The audio component 910 may determine scores indicating whether speech in the audio data 107 originated from particular users. For example, a first score may indicate a likelihood that speech in the audio data 107 originated from a first user associated with a first user identifier, a second score may indicate a likelihood that speech in the audio data 107 originated from a second user associated with a second user identifier, etc. The audio component 910 may perform user recognition by comparing speech characteristics represented in the audio data 107 to stored speech characteristics of users (e.g., stored voice profiles associated with the device 110 that captured the spoken user input).

FIG. 9B illustrates user recognition processing as may be performed by the user recognition component 195/295. The ASR component 150/250 performs ASR processing on ASR feature vector data 950. ASR confidence data 907 may be passed to the user recognition component 195/295.

The user recognition component 195/295 performs user recognition using various data including the user recognition feature vector data 940, feature vectors 905 representing voice profiles of users of the system 100, the ASR confidence data 907, and other data 909. The user recognition component 195/295 may output the user recognition data 995, which reflects a certain confidence that the user input was spoken by one or more particular users. The user recognition data 995 may include one or more user identifiers (e.g., corresponding to one or more voice profiles). Each user identifier in the user recognition data 995 may be associated with a respective confidence value, representing a likelihood that the user input corresponds to the user identifier. A confidence value may be a numeric or binned value.

The feature vector(s) 905 input to the user recognition component 195/295 may correspond to one or more voice profiles. The user recognition component 195/295 may use the feature vector(s) 905 to compare against the user recognition feature vector 940, representing the present user input, to determine whether the user recognition feature vector 940 corresponds to one or more of the feature vectors 905 of the voice profiles. Each feature vector 905 may be the same size as the user recognition feature vector 940.

To perform user recognition, the user recognition component 195/295 may determine the device 110 from which the audio data 107 originated. For example, the audio data 107 may be associated with metadata including a device identifier representing the device 110. Either the device 110 or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 940 produced from the audio data 107. The user recognition component 195/295 may send a signal to voice profile storage 985, with the signal requesting only audio data and/or feature vectors 905 (depending on whether audio data and/or corresponding feature vectors are stored) associated with the device identifier, the group profile identifier, and/or the user identifiers represented in the metadata. This limits the universe of possible feature vectors 905 the user recognition component 195/295 considers at runtime and thus decreases the amount of time to perform user recognition processing by decreasing the amount of feature vectors 905 needed to be processed. Alternatively, the user recognition component 195/295 may access all (or some other subset of) the audio data and/or feature vectors 905 available to the user recognition component 195/295. However, accessing all audio data and/or feature vectors 905 will likely increase the amount of time needed to perform user recognition processing based on the magnitude of audio data and/or feature vectors 905 to be processed.

If the user recognition component 195/295 receives audio data from the voice profile storage 985, the user recognition component 195/295 may generate one or more feature vectors 905 corresponding to the received audio data.

The user recognition component 195/295 may attempt to identify the user that spoke the speech represented in the audio data 107 by comparing the user recognition feature vector 940 to the feature vector(s) 905. The user recognition component 195/295 may include a scoring component 922 that determines respective scores indicating whether the user input (represented by the user recognition feature vector 940) was spoken by one or more particular users (represented by the feature vector(s) 905). The user recognition component 195/295 may also include a confidence component 924 that determines an overall accuracy of user recognition processing (such as those of the scoring component 922) and/or an individual confidence value with respect to each user potentially identified by the scoring component 922. The output from the scoring component 922 may include a different confidence value for each received feature vector 905. For example, the output may include a first confidence value for a first feature vector 905*a* (representing a first voice profile), a second confidence value for a second feature vector 905*b* (representing a second voice profile), etc. Although illustrated as two separate components, the scoring component 922 and the confidence component 924 may be combined into a single component or may be separated into more than two components.

The scoring component 922 and the confidence component 924 may implement one or more trained machine learning models (such as neural networks, classifiers, etc.) as known in the art. For example, the scoring component 922 may use probabilistic linear discriminant analysis (PLDA) techniques. PLDA scoring determines how likely it is that the user recognition feature vector 940 corresponds to a particular feature vector 905. The PLDA scoring may generate a confidence value for each feature vector 905 considered and may output a list of confidence values associated with respective user identifiers. The scoring component 922 may also use other techniques, such as GMMs, generative Bayesian models, or the like, to determine confidence values.

The confidence component 924 may input various data including information about the ASR confidence 907, speech length (e.g., number of frames or other measured length of the user input), audio condition/quality data (such as signal-to-interference data or other metric data), fingerprint data, image data, or other factors to consider how confident the user recognition component 195/295 is with regard to the confidence values linking users to the user input. The confidence component 924 may also consider the confidence values and associated identifiers output by the scoring component 922. For example, the confidence component 924 may determine that a lower ASR confidence 907, or poor audio quality, or other factors, may result in a lower confidence of the user recognition component 195/295. Whereas a higher ASR confidence 907, or better audio quality, or other factors, may result in a higher confidence of the user recognition component 195/295. Precise determination of the confidence may depend on configuration and training of the confidence component 924 and the model(s) implemented thereby. The confidence component 924 may operate using a number of different machine learning models/techniques such as GMM, neural networks, etc. For example, the confidence component 924 may be a classifier configured to map a score output by the scoring component 922 to a confidence value.

The user recognition component 195/295 may output user recognition data 995 specific to a one or more user identifiers. For example, the user recognition component 195/295 may output user recognition data 995 with respect to each received feature vector 905. The user recognition data 995 may include numeric confidence values (e.g., 0.0-1.0, 0-1000, or whatever scale the system is configured to operate). Thus, the user recognition data 995 may output an n-best list of potential users with numeric confidence values (e.g., user identifier 123—0.2, user identifier 234—0.8). Alternatively or in addition, the user recognition data 995 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 195/295 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 995 may only include information related to the top scoring identifier as determined by the user recognition component 195/295. The user recognition component 195/295 may also output an overall confidence value that the individual confidence values are correct, where the overall confidence value indicates how confident the user recognition component 195/295 is in the output results. The confidence component 924 may determine the overall confidence value.

The confidence component 924 may determine differences between individual confidence values when determining the user recognition data 995. For example, if a difference between a first confidence value and a second confidence value is large, and the first confidence value is above a threshold confidence value, then the user recognition component 195/295 is able to recognize a first user (associated with the feature vector 905 associated with the first confidence value) as the user that spoke the user input with a higher confidence than if the difference between the confidence values were smaller.

The user recognition component 195/295 may perform thresholding to avoid incorrect user recognition data 995 being output. For example, the user recognition component 195/295 may compare a confidence value output by the confidence component 924 to a threshold confidence value. If the confidence value does not satisfy (e.g., does not meet or exceed) the threshold confidence value, the user recognition component 195/295 may not output user recognition data 995, or may only include in that data 995 an indicator that a user that spoke the user input could not be recognized. Further, the user recognition component 195/295 may not output user recognition data 995 until enough user recognition feature vector data 940 is accumulated and processed to verify a user above a threshold confidence value. Thus, the user recognition component 195/295 may wait until a sufficient threshold quantity of audio data of the user input has been processed before outputting user recognition data 995. The quantity of received audio data may also be considered by the confidence component 924.

The user recognition component 195/295 may be defaulted to output binned (e.g., low, medium, high) user recognition confidence values. However, such may be problematic in certain situations. For example, if the user recognition component 195/295 computes a single binned confidence value for multiple feature vectors 905, the system may not be able to determine which particular user originated the user input. In this situation, the user recognition component 195/295 may override its default setting and output numeric confidence values. This enables the system to determine a user, associated with the highest numeric confidence value, originated the user input.

The user recognition component 195/295 may use other data 909 to inform user recognition processing. A trained model(s) or other component of the user recognition component 195/295 may be trained to take other data 909 as an input feature when performing user recognition processing. Other data 909 may include a variety of data types depending on system configuration and may be made available from other sensors, devices, or storage. The other data 909 may include a time of day at which the audio data 107 was generated by the device 110 or received from the device 110, a day of a week in which the audio data audio data 107 was generated by the device 110 or received from the device 110, etc.

The other data 909 may include image data or video data. For example, facial recognition may be performed on image data or video data received from the device 110 from which the audio data 107 was received (or another device). Facial recognition may be performed by the user recognition component 195/295. The output of facial recognition processing may be used by the user recognition component 195/295. That is, facial recognition output data may be used in conjunction with the comparison of the user recognition feature vector 940 and one or more feature vectors 905 to perform more accurate user recognition processing.

The other data 909 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 909 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 107 was received is a smart watch or vehicle belonging to a user A, the fact that the device 110 belongs to user A may increase a user recognition confidence value associated with user A and/or decrease a user recognition confidence value associated with user B.

The other data 909 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 107. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 909 may include data representing activity of a particular user that may be useful in performing user recognition processing. For example, a user may have recently entered a code to disable a home security alarm. A device 110, represented in a group profile associated with the home, may have generated the audio data 107. The other data 909 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 909 and considered by the user recognition component 195/295.

Depending on system configuration, the other data 909 may be configured to be included in the user recognition feature vector data 940 so that all the data relating to the user input to be processed by the scoring component 922 may be included in a single feature vector. Alternatively, the other data 909 may be reflected in one or more different data structures to be processed by the scoring component 922.

Figure 10:
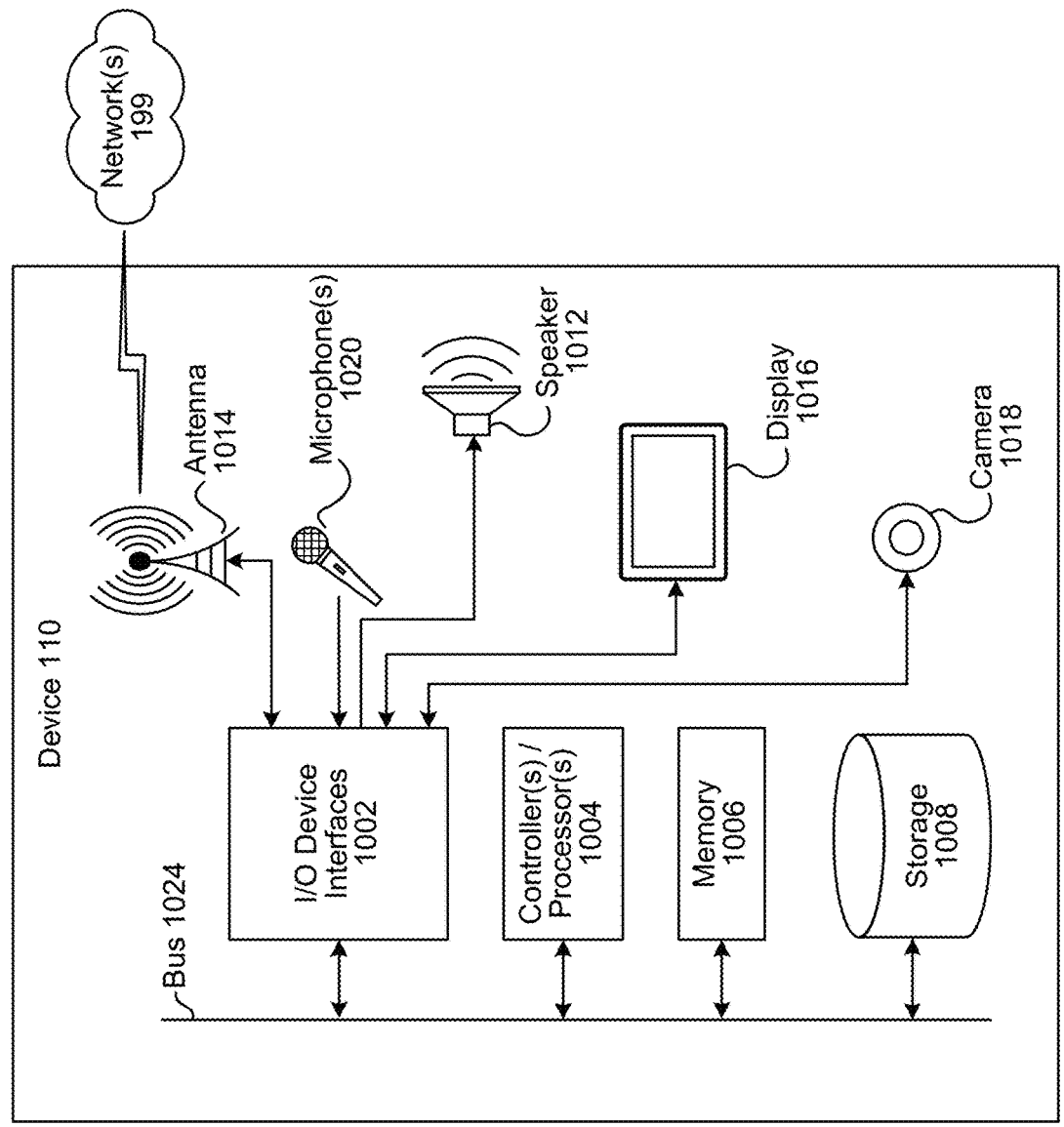
FIG. 10 is a block diagram conceptually illustrating example components of a device, according to embodiments of the present disclosure.
Figure 11:
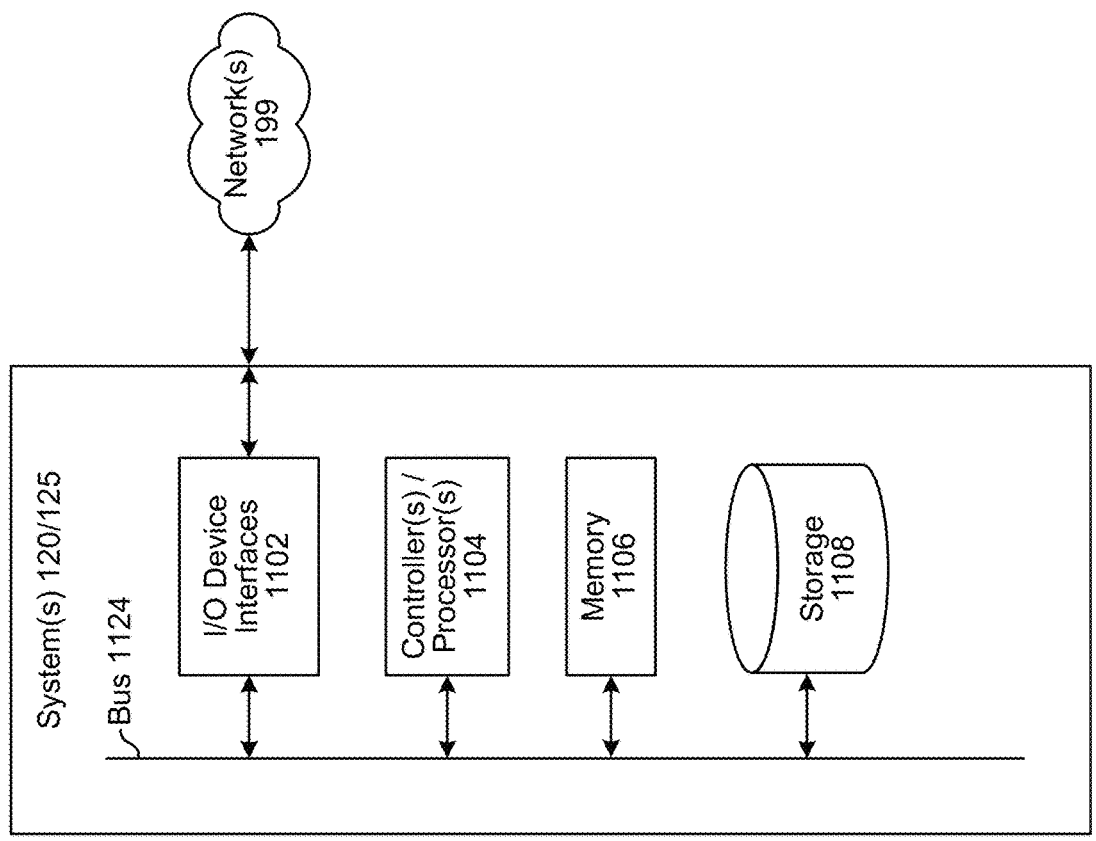
FIG. 11 is a block diagram conceptually illustrating example components of a system, according to embodiments of the present disclosure.

FIG. 10 is a block diagram conceptually illustrating a device 110 of the system 100. FIG. 11 is a block diagram conceptually illustrating example components of a remote device, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/ 1102), as will be discussed further below. Additionally, each device (110/120/125) may include an address/data bus (1024/1124) for conveying data among components of the respective device. Each component within a device (110/ 120/125) may also be directly connected to other components in addition to (or instead of) being connected to other components across the bus (1024/1124).

Referring to FIG. 10, the device 110 may include input/ output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device 110, the system 120, and/or skill 125 may include their own dedicated processors, memory, and/or storage. Alternatively, one or more of the components of the device 110, the system 120, and/or skill 125 may utilize the I/O interfaces (1002/1102), processor(s) (1004/1104), memory (1006/1106), and/or storage (1008/ 1108) of the device 110, the system 120, and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120, and the skill 125, as described herein, are illustrative, and may be located as a stand-alone device or may be included, in whole or in part, as a component of a larger device or system.

Figure 12:
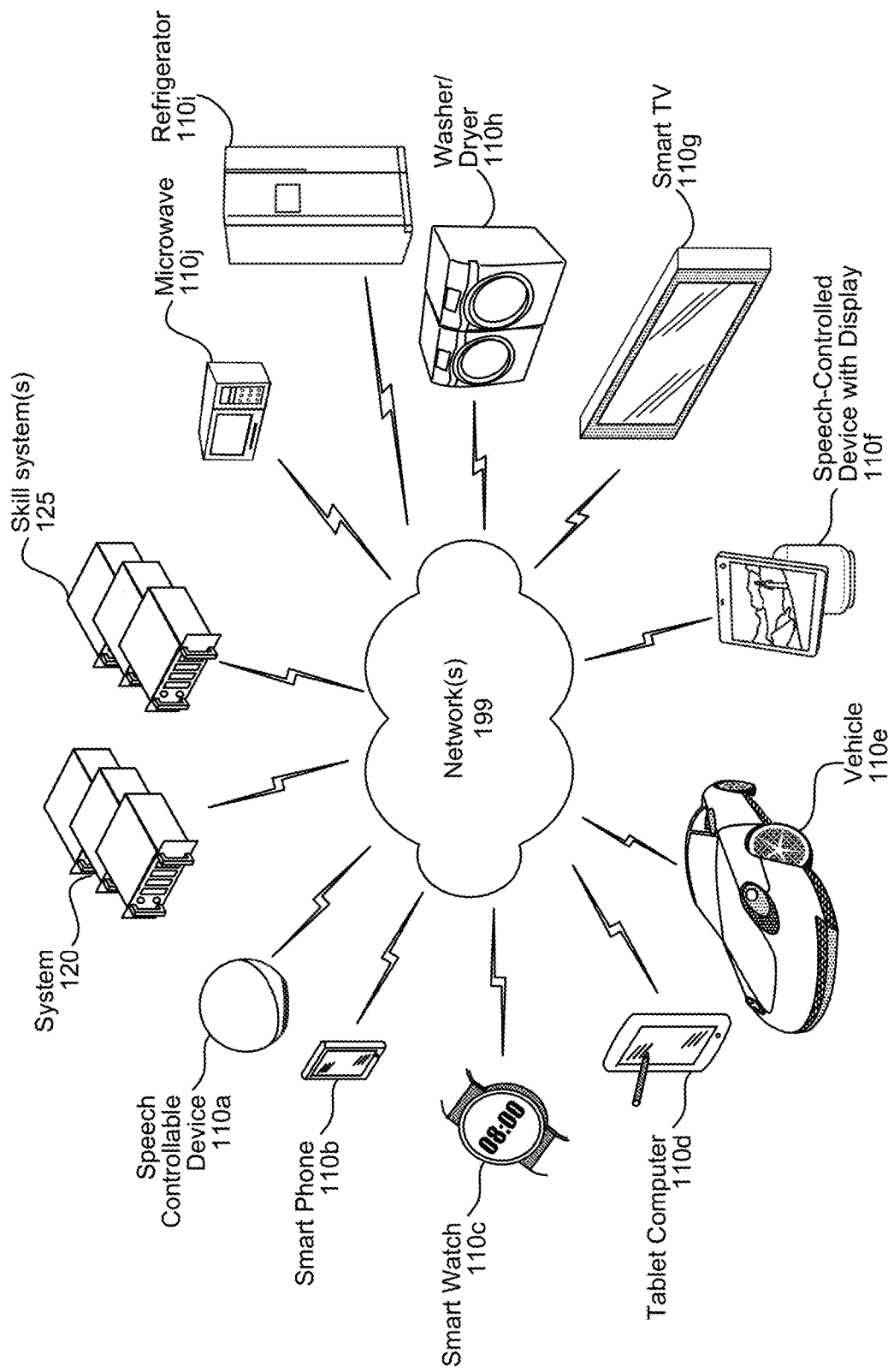
FIG. 12 illustrates an example of a computer network for use with the overall system, according to embodiments of the present disclosure.

As illustrated in FIG. 12, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving audio data representing a spoken input;
processing the audio data to determine a portion of the spoken input corresponding to a first entity name;
sending, to a first entity provider, a first command to determine one or more entities corresponding to the first entity name, the first command including a first identifier;
receiving, from the first entity provider, first data including at least a first entity corresponding to the first entity name;
receiving, from the first entity provider, second data including at least a second entity corresponding to the first entity name;
sending, to a skill component, the first data, and the first identifier;
receiving, from the skill component, a request for complete entity search results, the request including the first identifier; and
sending, to the skill component, the second data.

2. The computer-implemented method of claim 1, further comprising:
sending, to the first entity provider, a second command to enable the first entity provider to perform an entity search for the first entity name and based on user profile data corresponding to the audio data, the user profile data including a preference for at least one entity.

3. The computer-implemented method of claim 2, further comprising:
sending, to a second entity provider, a third command to determine one or more entities corresponding to the first entity name, the third command including a time duration within which the second entity provider is to output search results, the third command further including a second identifier;
receiving, from the second entity provider, third data including at least a third entity and a confidence score, the third data including the second identifier;
determining the confidence score is below a threshold value; and
selecting, based on determining the confidence score is below the threshold value, the first entity provider instead of the second entity provider for sending the second command.

4. The computer-implemented method of claim 1, further comprising:
sending the first command to further include a value indicating a maximum amount of data the first entity provider is to send in response to the first command, wherein a first size of the first data corresponds to the value, and wherein a second size of the second data is greater than the value.

5. The computer-implemented method of claim 1, further comprising:
determining intent data corresponding to the spoken input;
determining, based on the intent data and the first data, the skill component to respond to the spoken input; and
sending, to the skill component, the intent data.

6. The computer-implemented method of claim 1, further comprising:
sending the first command to further include a time duration within which the first entity provider is to output preliminary search results,
wherein the first data is received within the time duration, and the first data further includes a first indication that the first data corresponds to preliminary entity search results, and
wherein the second data is received after the time duration, and the second data further includes a second indication that the second data corresponds to complete entity search results.

7. A computer-implemented method comprising:
receiving a portion of a user input corresponding to a first entity name;
sending, to a first entity provider component, a first command to determine one or more entities corresponding to the first entity name, the first command including a first identifier;
receiving, from the first entity provider component and after sending the first command, first data including a first entity corresponding to the first entity name, the first data including the first identifier;
sending, to a skill selection component, the first data to enable selection of a skill component to respond to the user input;
receiving, from the first entity provider component, second data including at least a second entity corresponding to the first entity name, the second data including the first identifier;
receiving, from the skill component, a request for entity search results, the request including the first identifier; and
sending the second data to the skill component.

8. The computer-implemented method of claim 7, further comprising:
sending, to a second entity provider component, a second command to determine one or more entities corresponding to the first entity name, the second command including a second identifier;
receiving, from the second entity provider component, third data including at least a third entity corresponding to the first entity name, the third data including the second identifier; and
sending, to the skill selection component, the third data to enable selection of the skill component.

9. The computer-implemented method of claim 7, further comprising:
sending the first command to include a time duration within which the first entity provider component is to output first search results,
wherein the first data is received within the time duration, and
wherein the second data is received after the time duration.

10. The computer-implemented method of claim 7, further comprising:
sending the first command to include a value indicating a maximum amount of data that the first entity provider component can include in first search results,
wherein a first size of the first data corresponds to the value, and
wherein a second size of the second data is greater than the value.

11. The computer-implemented method of claim 7, further comprising:
receiving, from a second entity provider component, third data including at least a third entity associated with a confidence score representing the at least third entity corresponds to the first entity name; and selecting, based on the confidence score, the first entity provider component, instead of the second entity provider component, for receiving the second data from.

12. The computer-implemented method of claim 7, wherein receiving the second data comprises receiving the second data based on the first entity provider component performing an entity search using user profile data corresponding to the user input.

13. The computer-implemented method of claim 7, further comprising:
sending, to a second entity provider component, a second command to determine one or more entities corresponding to the first entity name;
receiving, from the second entity provider component, third data including at least a third entity associated with a first confidence score representing the at least third entity corresponds to the first entity name;
receiving the second data to further include a second confidence score representing the at least second entity corresponds to the first entity name;
determining a list of entities using the second data and the third data and based on the first confidence score and the second confidence score; and
sending the list of entities to the skill component.

14. The computer-implemented method of claim 7, further comprising:
storing the second data to enable the skill component access to entity search results for the user input.

15. A system comprising:
at least one processor; and
at least one memory including instructions that, when executed by the at least one processor, cause the system to:
receive a portion of a user input corresponding to a first entity name;
send, to a first entity provider component, a first command to determine one or more entities corresponding to the first entity name, the first command including a first identifier;
receive, from the first entity provider component and after sending the first command, first data including a first entity corresponding to the first entity name, the first data including the first identifier;
send, to a skill selection component, the first data to enable selection of a skill component to respond to the user input;
receive, from the first entity provider component, second data including at least a second entity corresponding to the first entity name, the second data including the first identifier;
receive, from the skill component, a request for entity search results, the request including the first identifier; and
send the second data to the skill component.

16. The system of claim 15, wherein the at least one memory includes further instructions that, when executed by the at least one processor, further cause the system to:
send, to a second entity provider component, a second command to determine one or more entities corresponding to the first entity name, the second command including a second identifier;
receive, from the second entity provider component, third data including at least a third entity corresponding to the first entity name, the third data including the second identifier; and
send, to the skill selection component, the third data to enable selection of the skill component.

17. The system of claim 15, wherein the at least one memory includes further instructions that, when executed by the at least one processor, further cause the system to:
send the first command to include a time duration within which the first entity provider component is to output first search results,
wherein the first data is received within the time duration, and
wherein the second data is received after the time duration.

18. The system of claim 15, wherein the at least one memory includes further instructions that, when executed by the at least one processor, further cause the system to:
send the first command to include a value indicating a maximum amount of data that the first entity provider component can include in first search results,
wherein a first size of the first data corresponds to the value, and
wherein a second size of the second data is greater than the value.

19. The system of claim 15, wherein the at least one memory includes further instructions that, when executed by the at least one processor, further cause the system to:
receive, from a second entity provider component, third data including at least a third entity associated with a confidence score representing the at least third entity corresponds to the first entity name; and
select, based on the confidence score, the first entity provider component, instead of the second entity provider component, for receiving the second data from.

20. The system of claim 15, wherein the instructions that cause the system to receive the second data, further cause the system to receive the second data based on the first entity provider component performing an entity search using user profile data corresponding to the user input.

21. The system of claim 15, wherein the at least one memory includes further instructions that, when executed by the at least one processor, further cause the system to:
send, to a second entity provider component, a second command to determine one or more entities corresponding to the first entity name;
receive, from the second entity provider component, third data including at least a third entity associated with a first confidence score representing the at least third entity corresponds to the first entity name;
receive the second data to further include a second confidence score representing the at least second entity corresponds to the first entity name;
determine a list of entities using the second data and the third data and based on the first confidence score and the second confidence score; and
send the list of entities to the skill component.

22. The system of claim 15, wherein the at least one memory includes further instructions that, when executed by the at least one processor, further cause the system to:
store the second data to enable the skill component access to entity search results for the user input.

* * * * *